United States Patent
Hamlet et al.

(10) Patent No.: US 8,516,269 B1
(45) Date of Patent: Aug. 20, 2013

(54) HARDWARE DEVICE TO PHYSICAL STRUCTURE BINDING AND AUTHENTICATION

(75) Inventors: Jason R. Hamlet, Albuquerque, NM (US); David J. Stein, Albuquerque, NM (US); Todd M. Bauer, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 290 days.

(21) Appl. No.: 12/908,324

(22) Filed: Oct. 20, 2010

Related U.S. Application Data

(63) Continuation-in-part of application No. 12/844,860, filed on Jul. 28, 2010.

(51) Int. Cl.
*G06F 21/00* (2006.01)

(52) U.S. Cl.
USPC ............... 713/189; 380/29; 380/44; 380/270; 726/2; 726/5; 726/6; 726/26; 340/5.8; 705/318; 713/168; 713/180; 713/185

(58) Field of Classification Search
USPC .................... 380/29, 44, 270; 726/2, 5, 6, 26; 340/5.8; 705/318; 713/168, 180, 185, 189
See application file for complete search history.

(56) References Cited

U.S. PATENT DOCUMENTS

| | | | |
|---|---|---|---|
| 7,370,190 B2 | 5/2008 | Calhoon et al. | |
| 7,681,103 B2 | 3/2010 | Devadas et al. | |
| 2003/0204743 A1 | 10/2003 | Devadas et al. | |
| 2006/0209584 A1 | 9/2006 | Devadas et al. | |
| 2006/0210082 A1 | 9/2006 | Devadas et al. | |
| 2006/0221686 A1 | 10/2006 | Devadas et al. | |
| 2006/0271793 A1 | 11/2006 | Devadas et al. | |
| 2007/0038871 A1 | 2/2007 | Kahlman et al. | |
| 2007/0044139 A1 | 2/2007 | Tuyls et al. | |
| 2007/0183194 A1 | 8/2007 | Devadas et al. | |
| 2008/0044027 A1 | 2/2008 | Van Dijk | |
| 2008/0059809 A1 | 3/2008 | Van Dijk | |
| 2009/0083833 A1 | 3/2009 | Ziola et al. | |
| 2009/0222672 A1* | 9/2009 | Clarke et al. ................... | 713/189 |
| 2009/0254981 A1 | 10/2009 | Devadas et al. | |
| 2010/0127822 A1* | 5/2010 | Devadas ......................... | 340/5.8 |

(Continued)

OTHER PUBLICATIONS

Suh et al., "Physical Unclonable Functions for Device Authentidcation and Secret Key Generation", DAC 2007 Proceedings of teh 44th annual Design Automation Conference pp. 9-14.*

(Continued)

*Primary Examiner* — Brandon Hoffman
*Assistant Examiner* — Hee Song
(74) *Attorney, Agent, or Firm* — Cory G. Claassen

(57) ABSTRACT

Detection and deterrence of device tampering and subversion may be achieved by including a cryptographic fingerprint unit within a hardware device for authenticating a binding of the hardware device and a physical structure. The cryptographic fingerprint unit includes an internal physically unclonable function ("PUF") circuit disposed in or on the hardware device, which generate an internal PUF value. Binding logic is coupled to receive the internal PUF value, as well as an external PUF value associated with the physical structure, and generates a binding PUF value, which represents the binding of the hardware device and the physical structure. The cryptographic fingerprint unit also includes a cryptographic unit that uses the binding PUF value to allow a challenger to authenticate the binding.

31 Claims, 12 Drawing Sheets

(56) References Cited

U.S. PATENT DOCUMENTS

2011/0002461 A1* 1/2011 Erhart et al. .................. 380/44
2011/0099117 A1* 4/2011 Schepers et al. ............. 705/318
2011/0191837 A1* 8/2011 Guajardo Merchan et al. .. 726/6

OTHER PUBLICATIONS

Guajardo et al., "Physical Unclonable Functions and Public-Key Crypto for FPGA IP Protection", 2007, pp. 7, http://www.sandeepkumar.org/my/papers/2007_FPL_PUFnPKC.pdf.*

Bosch et al., "Efficient Helper Data Key Extractor on FPGAs", pp. 1-17, 2008, http://www.iacr.org/archive/ches2008/51540179/51540179.pdf.*

Su, Ying et al., "A Digital 1.6 pJ/bit Chip Identification Circuit Using Process Variations", IEEE Journal of Solid-State Circuits, Jan. 2008, pp. 69-77, vol. 43, No. 1.

Lee, Jae W. et al., "A Technique to Build a Secret Key in Integrated Circuits for Identification and Authentication Applications; Computation Structures Group Memo 472", 2004, 6 pages, Massachusetts Institute of Technology, Computer Science and Artificial Intelligence Laboratory.

Kaps, Jens-Peter et al., "Energy Scalable Universal Hashing", IEEE Transactions on Computers, Dec. 2005, pp. 1484-1495, vol. 54, No. 12.

Kumar, Sandeep S. et al., "Extended Abstract: The Butterfly PUF Protecting IP on every FPGA", Proceedings of the 2008 iEEE International Workshop on Hardware-Oriented Security and Trust, 2008, 4 pages.

Guajardo, Jorge et al., "FPGA Intrinsic PUFs and Their Use for IP Protection", Proceedings of the 9th international workshop on Cryptographic Hardware and Embedded Systems, Lecture Notes in Computer Science; vol. 4727, 2007, pp. 63-80.

Dodis, Yevgeniy et al., "Fuzzy Extractors: How to Generate Strong Keys from Biometrics and Other Noisy Data", SIAM Journal on Computing, 2008, 18 pages, vol. 38, Issue 1.

Maes, Roel et al., "Intrinsic PUFs from Flip-flops on Reconfigurable Devices", 3rd Benelux Workshop on Information and System Security, Nov. 2008, 17 pages.

Krawczyk, Hugo, "LFSR-based Hashing and Authentication", Advances in Cryptoiogy—Crypto '94, LNCS 839, 1994, pp. 129-139.

Suh, Edward G. et al., "Physical Unclonable Functions for Device Authentication and Secret Key Generation", Proceedings of the 44th annual Design Automation Conference, 2007, pp. 9-14.

Guajardo, Jorge et al., "Physical Unclonable Functions and Public-Key Crypto for FPGA IP Protection", 2007, 7 pages, Philips Research Laboratories, Eindhoven, The Netherlands.

Gassend, Blaise et al., "Silicon Physical Random Features, Computation Structures Group Memo 456", In the proceedings of the Computer and Communication Security Conference, Nov. 2002, 15 pages, Massachusetts Institute of Technology, Computer Science and Artificial Intelligence Laboratory.

Tuyls, P. et al., "Secret Key Generation from Classical Physics, Physical Unclonable Functions", 2006, 20 pages, Phillips Research Laboratories, The Netherlands.

Guajardo, Jorge et al., "Physical Unclonable Functions and Public-Key Crypto for FPGA IP Protection", Sep. 11, 2007, 22 pages, Philips Research Europe, Eindhoven, The Netherlands.

Bauer, Todd et al., "Infrastructure for Nondestructive Real-time Fingerprinting of Integrated Circuits", Laboratory Directed Research and Development Presentation Day, Sep. 14, 2009, 1 page, Sandia National Laboratories, Albuquerque, New Mexico.

Kommerling, Oliver et al., "Design Principles for Tamper-Resistant Smartcard Processors", Proceedings of the USENIX Workshop on Smartcard Technology on USENIX Workshop on Smartcard Technology, May 10-11, 1999, 13 pages, USENIX Association.

ATIS Telecom Glossary 2007, <http://www.atis.org/glossary/definition.aspx?id=3516 >, retrieved from Internet on Sep. 9, 2010, 2 pages.

Roy, Jarrod A. et al, "Protecting Bus-based Hardware IP by Secret Sharing", Proceedings of the 45th Annual Design Automation Conference, 2008, 6 pages, Anaheim, CA.

Kirkpatrick, Michael et al., "Physically Restricted Authentication and Encryption for Cyber-physical Systems", DHS Workshop on Future Directions in Cyber-physical Systems Security, 2009, 5 pages.

* cited by examiner

HARDWARE DEVICE TO PHYSICAL STRUCTURE BINDING AND AUTHENTICATION

RELATED APPLICATIONS

This application is a continuation-in-part of U.S. patent application Ser. No. 12/844,860, entitled "Deterrence of Device Counterfeiting, Cloning, and Subversion by Substitution Using Hardware Fingerprinting," filed Jul. 27, 2010, the contents of which are hereby incorporated by reference.

STATEMENT REGARDING FEDERALLY SPONSORED RESEARCH

This invention was developed with Government support under Contract No. DE-AC04-94AL85000 between Sandia Corporation and the U.S. Department of Energy. The U.S. Government has certain rights in this invention.

TECHNICAL FIELD

This disclosure relates generally to trusted computing, and in particular but not exclusively, relates to binding authentication to protect against tampering and subversion by substitution.

BACKGROUND INFORMATION

Trustworthy computing (with software) cannot exist without trustworthy hardware to build it on. Even if an integrated circuit is produced using rigorous procedures in a "Trusted Foundry" and certified as "trustworthy," technology must be developed to ensure against wholesale replacement of the component with a separately manufactured but subverted "look-alike" after the point of certification. Without detection of subversion by wholesale component substitution, today's information processing systems are vulnerable to sophisticated adversaries that can fabricate "look-alike" components that perform the same function as the intended component but which may contain additional subversion artifices that can be later triggered by an adversary to disrupt or compromise operation.

Using physical system protection schemes to prevent subversive attacks in deployed information processing hardware is technically difficult and expensive. An alternative to resisting subversive attack with physical system protection schemes is to employ robustly authenticated and protected hardware architectures to enable tracing of the origin of these components. Physically Unclonable Function (PUF) technology may be leveraged to detect and deter adversaries from attempting subversion by insertion of subversive functionality and by instantiation of counterfeit components (subversion via substitution). PUFs are derived from the inherently random, physical characteristics of the material, component, or system from which they are sourced, which makes the output of a PUF physically or computationally very difficult to predict. Silicon-based microelectronics appear to be a potentially rich source of PUFs because subtle variations in the production processes result in subtle variations in the physical and operational properties of the fabricated devices. Additionally, each device can have millions of exploitable transistors, circuits, and other active and passive components. Accordingly, PUFs extracted from microelectronics are of keen interest because of their potential applications to cyber security.

Trusted foundry processing of silicon-based microelectronics requires enormous investments to protect against subversion; however, this investment imparts trust only during the fabrication phase of a component's life cycle. Without the equivalent of rigorous two-person control of the component during the deployment phase of its life cycle, it can be difficult to demonstrate authenticity even for components from today's trusted foundries.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Figure 1:
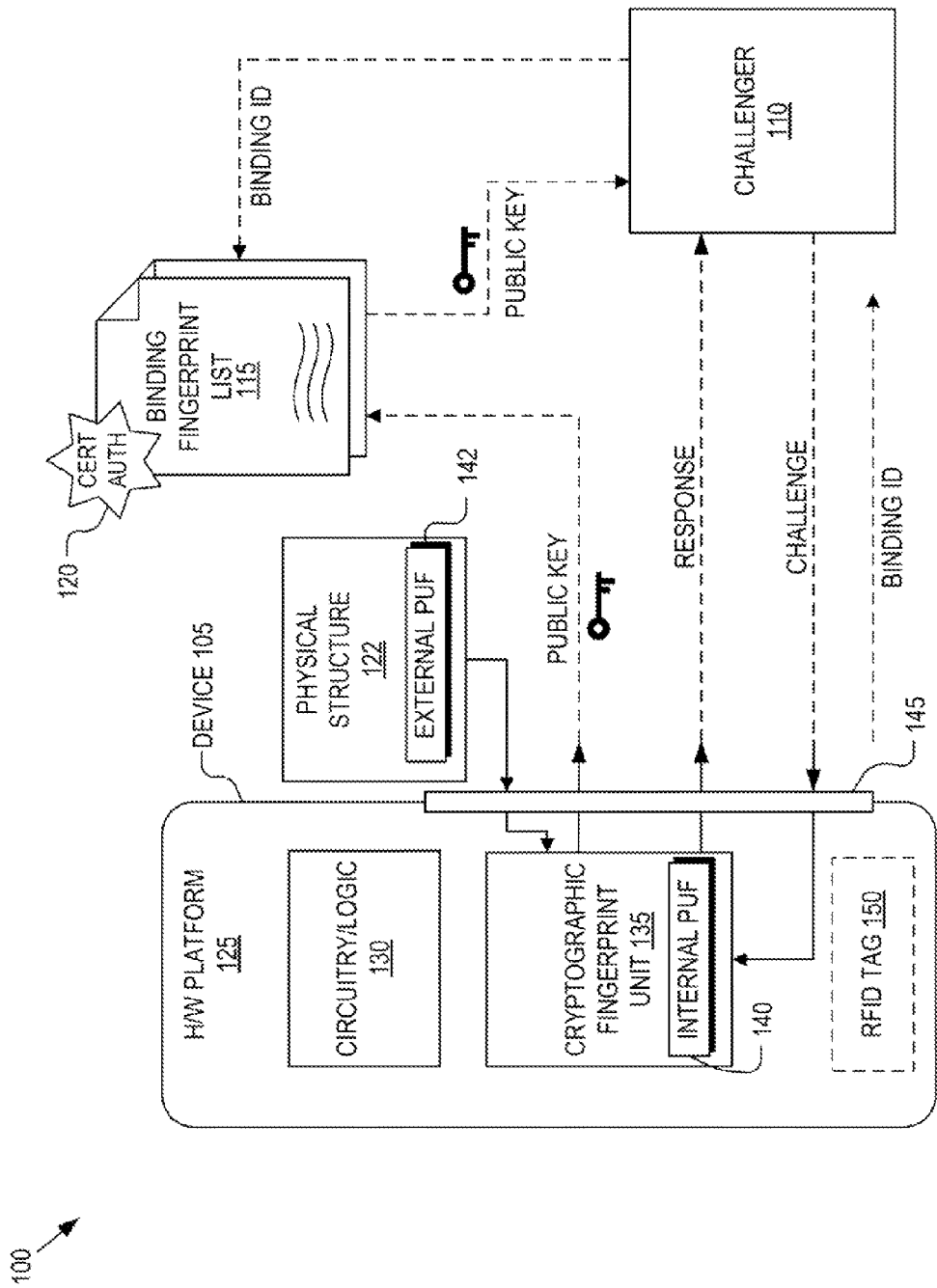
FIG. 1 is a functional block diagram illustrating a fingerprinting infrastructure for authenticating bindings of hardware devices and physical structures and detecting device tampering and subversion by substitution, in accordance with an embodiment of the invention.

Embodiments of a system and method for authenticating bindings of hardware devices and physical structures to detect and deter device tampering and subversion by substitution are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. in other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Embodiments of the present invention augment the trustworthiness of deployed information processing systems by introducing the concept of a unique "binding fingerprint" and a cryptographic challenge/response protocol for authenticating the binding fingerprint to protect against device tampering and subversion by substitution. The embodiments describe a technique for binding a hardware device (e.g., including an integrated circuit) to a physical structure, such as a strain-sensitive tape, so that the binding can be cryptographically authenticated. Disclosed embodiments leverage Physical Unclonable Function (PUF) technology for creation of a binding fingerprint using two PUF values, one PUF value associated with a hardware device and another PUF value associated with the physical structure that is bound to the hardware device. PUFs are derived from random physical characteristics within the hardware of a device and within the physical structure, which makes a PUF output difficult to predict from one device to another. The two PUF outputs can be subsequently combined and used to generate the binding fingerprint, which can be authenticated at any time during the deployment phase of a component life cycle using a cryptographic challenge/response protocol. The embodiments allow for robust tamper detection and, as such, represent a deterrent to tampering and subversion.

Some applications of these embodiments are non-proliferation, where the embodiments could be used to ensure secure transportation, for example, to ensure that a container holding nuclear material has not been opened, or to verify that containers have not been opened, tampered with, or substituted for other containers en route. As another example of an application for embodiments of the invention, the state of California may require by 2015 that prescription medications be traced and authenticated throughout the supply chain. The embodiments described herein could be used to trace and authenticate the containers transporting the prescription medications. Alternatively, the embodiments may be used in other applications to bind and authenticate an integrated circuit or other hardware devices to physical structures using PUFs.

PUFs are functions that are derived from the inherently random, physical characteristics of the material or device in which they are built. For example, silicon PUFs may exploit variations in the delay through interconnects and gates or slight differences in threshold voltage. Since the PUF exploits physical variations of the device or material in which it is built, each PUF should provide a unique (although perhaps noisy) response. This property should hold even amongst "identical" devices fabricated with the same process. Moreover, it should be difficult to purposefully produce a PUF with the same output as a given PUF. The quality of a PUF can be measured by inter-device variation and intra-device variation. Ideally, the inter-device variation of a PUF should be near 50% so different devices produce very different output, while the intra-device variation should be near 0% so that a given device consistently provides the same response. In practice, inter-device and intra-device variations will be non-ideal. Additionally, a good PUF should be resistant to changes in factors, such as, for example, temperature and supply voltage.

Silicon PUFs can be broadly categorized as delay based and memory based. Delay based PUFs, such as a ring oscillator PUF and an arbiter, measure the difference in delay through "identical" circuits. Memory based PUFs exploit variations in memory structures, such as cross-coupled logic gates and latches and SRAM cells. Various examples of different silicon PUF circuits are illustrated and described with respect to FIGS. 9A-12. Other PUFs can be used, for example, optical coating PUFs, magnetic PUFs, etc. Also described herein are analog PUFs disposed on or within the physical structures. One type of analog PUF is a coating PUF as described below in connection with FIG. 13. Unlike the PUF circuits described in FIGS. 9A-12, which output a digital value or a sequence of bits, the analog PUFs generate analog output. In some cases the analog output can be further processed and subsequently digitized.

FIG. 1 is a functional block diagram illustrating a fingerprinting infrastructure 100 for authenticating bindings of hardware devices and physical structures and detecting device tampering and subversion by substitution, in accordance with an embodiment of the invention. The illustrated embodiment of infrastructure 100 includes a hardware device 105 and a physical structure 122 to be authenticated, a challenger 110 interested in authenticating the binding of hardware device 105 and physical structure 122, and a binding fingerprint list 115 maintained or certified by a certification authority 120. The illustrated embodiment of hardware device 105 includes a hardware platform 125, primary circuitry (or function logic) 130 of the device, a cryptographic fingerprint unit 135 including an internal. PUF circuit 140, a radio-frequency identification (RFID) tag 150, and input/output ("I/O") ports 145. In the depicted embodiment, the RFID tag 150 is part of the hardware device 105. In another embodiment, the hardware platform itself can be an RFID tag. For example, the RFID's IC can be bound to the RFID's packaging. Cryptographic fingerprint unit 135 may be implemented entirely within hardware or partially using hardware and partially using software/firmware. In either embodiment, the internal PUF circuit 140, which may be implemented using any PUF circuit having suitably small intra-device variation and sufficiently large inter-device variation, including but not limited to PUF circuits 900, 1000, 1100, 1200, along with primary circuitry 130 are both integrated into hardware platform 125. For example, if hardware device 105 is a semiconductor based integrated circuit ("IC"), then the internal PUF circuit 140 may be integrated into the semiconductor die including circuitry 130. Of course, other components of cryptographic fingerprint unit 135 (described below in connection with FIG. 6) may also be integrated into hardware platform 125 of hardware device 105.

Hardware device 105 may represent any device of which hardware authentication during the deployment phase of its lifecycle is desired. For example, hardware device 105 may represent a CPU, a microcontroller, video card, or virtually any hardware device, which may or may not include software/firmware code. Hardware platform 125 may include a semiconductor die of an application specific IC ("ASIC") or general purpose IC (e.g., CPU), a field programmable gate array ("FPGA"), a printed circuit board ("PCB"), or otherwise. It should be appreciated that hardware platform 125 may include memory units for storing executable code (e.g. software or firmware) for operating primary circuitry 130 and/or portions of cryptographic fingerprint unit 135.

RFID tag 150 may be incorporated into hardware device 105 for the purpose of identification and tracking using radio waves. An RFID tag reader from several meters away and beyond the line of sight can read RFID tag 150. RFID tag 150 may include an integrated circuit for storing and processing information, modulating and demodulating a RF signal, and an antenna for receiving and transmitting the signal. RFID tag 150 can be implemented partially or fully in device circuitry 130. For instance, hardware device 105 may be a device for monitoring and tracking power consumption in a commercial or residential structure. The binding of the physical structure and hardware device 105 can detect device tampering and subversion, while RFID tag 150 can provide the ability for a person to authenticate the binding, as well as read the power consumption values. Of course, hardware device 125, physical structure 122, and/or RFID tag 150 can be used in other applications.

External communication with cryptographic fingerprint unit 135 is conducted through I/O ports 145. In one embodiment, I/O ports 145 may include existing industry standard test ports, such as a Joint Test Action Group ("JTAG") test access port ("TAP"). Of course, external communications may be multiplexed over standard data ports or other types of test ports.

The illustrated embodiment of physical structure 122 includes an external PUF circuit 142. The external PUF circuit 142 generates a unique external PUF value. In one embodiment, cryptographic fingerprint unit 135 is configured to measure the internal PUF value and the external PUF value located on physical structure 122. In another embodiment, the external. PUF value is measured by circuitry disposed on or within physical structure 122 and sent to hardware device 105, as described herein. Unlike the internal PUF value that remains internal to hardware device 105 and is not transmitted externally, the external PUF value is external to hardware device 105 and is transmitted to hardware device 105 for binding and authenticating purposes. For example, as described with respect to FIG. 3, the external PUF value can be measured by a second integrated circuit and transmitted to cryptographic fingerprint unit 135 via I/O ports 145. In these embodiments, external PUF circuit 142 can be integrated or packaged with the integrated circuit, and may be any PUF circuit having suitably small intra-device variation and sufficiently large inter-device variation, including but not limited to PUF circuits 900, 1000, 1100, 1200.

In one embodiment, the external PUF is an analog PUF, such as a coating PUF (illustrated in FIG. 13) disposed on or within physical structure 122. The analog PUF, which is located on or within physical structure 122 outputs the external PUF value, which is combined with the internal PUF value to generate a binding PUF value, as described in more detail below. Physical structure 122 may be strain-sensitive tape, a fastener (e.g., a bolt, a buckle, a clamp, a clasp, a clip, a hasp, a hook, a latch, a snap, a screw, etc), a dielectric material having printed conductive wires or traces, a polymer having embedded conductive particles, a coating having embedded dielectric particles, a semiconductor die, a flexible substrate, or the like. In another embodiment, physical structure 122 includes an RFID tag, similar to RFID tag 150 described above. For example, the RFID tag could be embedded in physical structure 122. In this embodiment, the RFID tag can wirelessly transmit a RF signal to cryptographic fingerprint unit 135 with the external PUF value. For example, the RFID tag's integrated circuit may measure the external PUF value, and send the external PUF value to cryptographic fingerprint unit 135 for binding and for authentication. The signal may include the external PUF value itself or a value derived from the external PUF value, such as an encrypted value of the external PUF value. During authentication, if cryptographic fingerprint unit 135 does not detect the RFID tag or if a different value is detected for the RFID tag, cryptographic fingerprint unit 135 will know that the physical structure has been tampered with or substituted, and the authentication will fail. Alternatively, the physical structure may include other circuitry than an RFID tag to measure and transmit the external PUF value to cryptographic fingerprint unit 135 for binding and authenticating physical structure 122 and hardware device 105.

Figure 2:
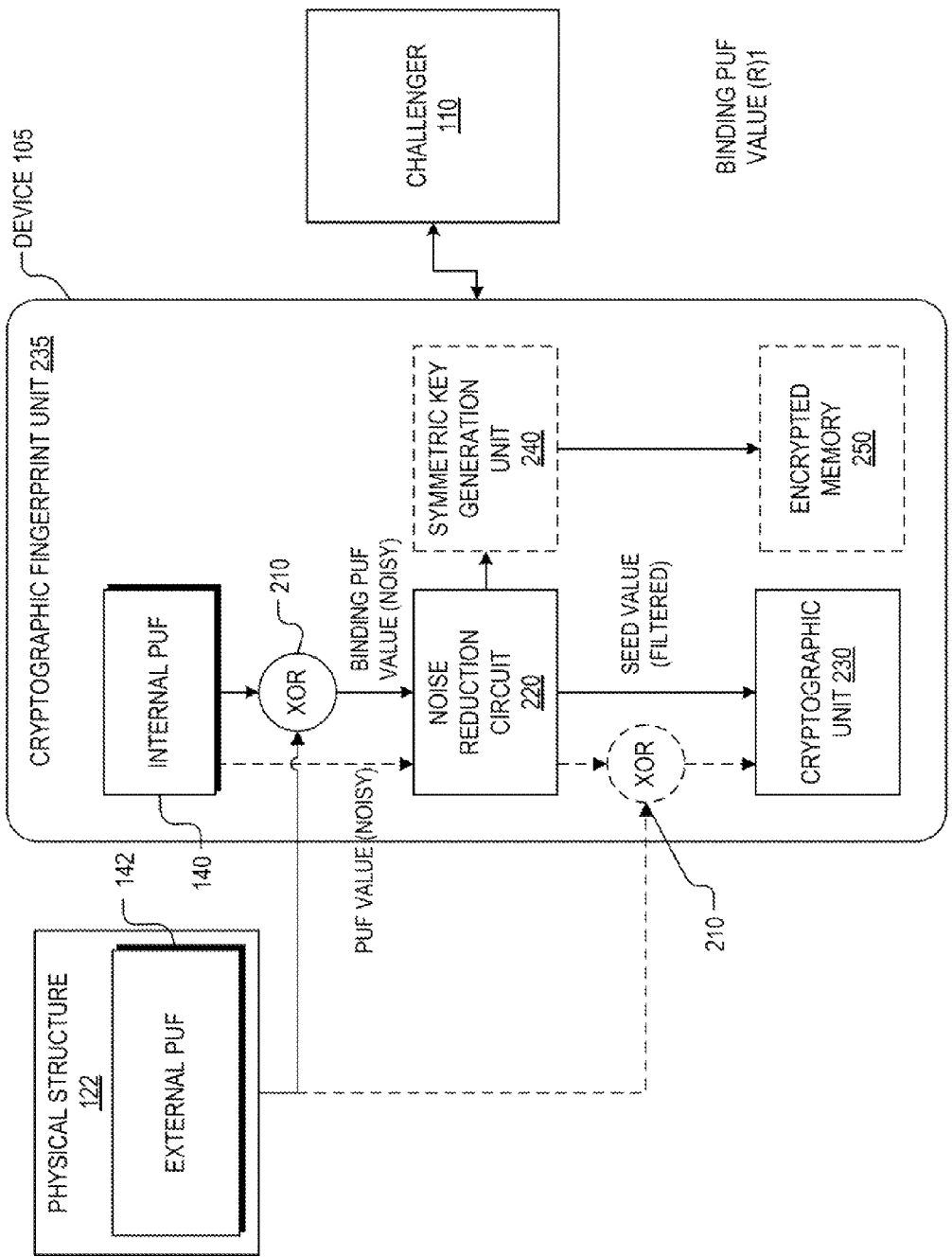
FIG. 2 is a functional block diagram illustrating a cryptographic fingerprint unit for authenticating a binding between the hardware device and the physical structure, in accordance with an embodiment of the invention.

FIG. 2 is a functional block diagram illustrating a cryptographic fingerprint unit 235 for authenticating a binding between hardware device 105 and physical structure 122, in accordance with an embodiment of the invention. The depicted cryptographic fingerprint unit 235 includes the internal PUF circuit disposed in or on hardware device 105, binding logic 210 (e.g., depicted XOR operation), noise reduction circuit 220, a cryptographic unit 230, a symmetric key generation unit 240, and encrypted memory 250. The internal PUF circuit 140 outputs the internal. PUF value. Binding logic 210 receives the internal PUF value and an external PUF value. In the depicted embodiment, binding logic 210 receives the external PUF value from external PUF circuit 142 of physical structure 122 and generates a binding PUF value using the internal and external PUF values. In another embodiment, cryptographic fingerprint unit 235 measures the internal PUF value and the external PUF value and inputs the values into binding logic 210. In the illustrated embodiment, binding logic 210 uses an XOR function to combine the two values. Alternatively, other logic operations may be used, such as XNOR, NAND, AND, OR, a concatenation operation, or any logic operation that does not amplify the noise. Addition and subtractive operations may not be ideal because small change in the input can lead to large changes in output.

Since the PUF values may be inherently noisy, such as due to thermal variations, etc, the binding PUF value may also become noisy. Thus, directly using the binding PUF value to seed cryptographic unit 230 may not be advisable in some implementations. Accordingly, in some embodiments a noise reduction circuit 220 is interposed between binding logic 210 and cryptographic unit 230 to convert the noisy binding PUF value to a filtered PUF seed that is stable and repeatable. Thus, noise reduction circuit 220 operates to remove the intra-device uncertainty in the noisy binding PUF value. In one embodiment, noise reduction circuit 220 is implemented as a fuzzy extractor, which uses error code correcting ("ECC") techniques to remove undesirable variability. Operation of a fuzzy extractor implementation of noise reduction circuit 220 is discussed in detail in connection with FIGS. 7 and 8 below.

The cryptographic unit 230 is coupled to receive the filtered binding seed value, which is based on the binding PUF value. The cryptographic unit 230 uses the binding seed value to generate a cryptographic key. In one embodiment, the cryptographic key is a public key of an asymmetric key pair that allows challenger 110 (e.g. authenticating entity) to authenticate the binding of hardware device 105 and physical structure 122 using encryption and decryption. Alternatively, the cryptographic unit 230 uses the binding seed value to generate other cryptographic keys for other authentication techniques, for example, those that don't require encryption and decryption (e.g., the Schnorr identification protocol).

Figure 6:
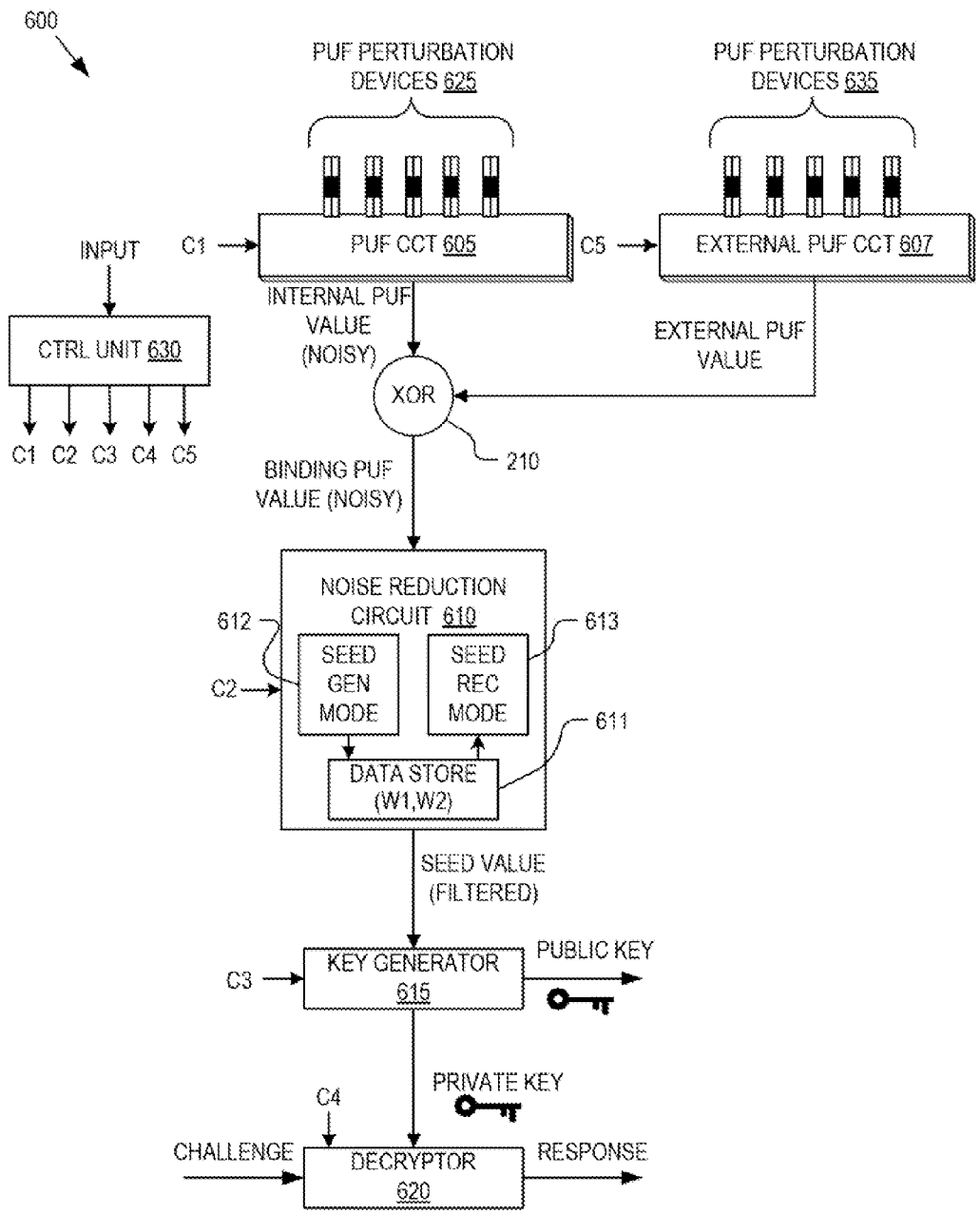
FIG. 6 is a functional block diagram illustrating a cryptographic fingerprint unit, in accordance with an embodiment of the invention.

In one embodiment, cryptographic unit 230 includes a key generator and a decryptor, as illustrated and described in more detail with respect to FIG. 6). The key generator receives the binding seed value from the noise reduction circuit 220, and generates the private key S and the public key P based on the binding PUF value. The decryptor receives an authentication challenge, posed to hardware device 105 and encrypted with the public key P, and outputs a response to the authentication challenge decrypted with the private key S. The cryptographic unit 230 may operate in an initial enrollment phase and subsequent authentication phases as described below. In one embodiment, the private key is never transmitted externally to the hardware device 105, and is not stored or retained any longer than required to decrypt the authentication challenge. Each time the private key is needed by the hardware device 105, the private key is regenerated using the internal and external PUF values, and then subsequently deleted or erased after use.

During an initial enrollment phase, cryptographic fingerprint unit 235 measures the internal PUF (e.g., integrated PUF) and an analog PUF (e.g., coating PUF) located on physical structure 122. The PUF responses are combined using binding logic 210, illustrated in FIG. 2 as an XOR operation, and input to noise reduction circuit 220 (e.g., a fuzzy extractor), which runs its enrollment procedure to generate helper data W and the filtered seed value (e.g., a unique identifier I). Cryptographic fingerprint unit 235 stores the helper data W publicly (e.g., stored publicly on the IC and/or external to the IC), and inputs I (the filtered seed value) to cryptographic unit 230. The cryptographic unit 230 uses I to generate a public key P that is emitted from hardware device 105, and stored in a binding fingerprint list 115, which is signed by certificate authority 120, for example. After key generation, device circuitry 130 (e.g., IC) then clears its internal registers so that the PUF responses, binding PUF value, and any values stored in noise reduction circuit 230 and cryptographic unit 230 are erased.

During a subsequent authentication phase, challenger 110 selects or generates a test value or test random value, c, as a secret phrase challenge to authenticate the binding of hardware device 105 and physical structure 122, and encrypts c with the public key P belonging to the binding combination of hardware device 105 and physical structure 122. Challenger 110 sends a challenge P(c) to cryptographic fingerprint unit 235. Cryptographic fingerprint unit 235 measures its own internal PUF and the physical structure's external PUF, and binding logic 210 combines them to generate the binding PUF value. The noise reduction circuit 220 reads the helper data W (stored publicly on the IC, external to the IC, sent by the authenticating entity, or otherwise), and recovers the binding seed value (e.g., identifier I from the noisy PUF measurements). Then, the binding seed value/is used by the cryptographic unit 230 to generate the private key S that corresponds to the public key P and calculates the random value c (S(P (c))= c). Cryptographic fingerprint unit 235 returns c to challenger 110, which verifies that c is correct.

In another embodiment, binding logic 210 is coupled between the noise reduction circuit 220 and cryptographic unit 230 (illustrated in FIG. 2 with dashed lines). In this embodiment, noise reduction circuit 230 receives the noisy internal PUF value from internal. PUF circuit 140, and converts the noisy internal PUF value to a filtered PUF seed that is stable and repeatable (e.g., corrects for intra-device variation). Binding logic 210 receives the filtered PUF seed and combines it with the external PUF value to create the binding PUF value that is used to seed cryptographic unit 230 for the key generation. This binding PUF value can also be used to seed a symmetric key generation unit 240 as described below. It should be noted that this embodiment may give the wrong keys if there is any noise in the external PUF value, since the internal PUF is error corrected, but the external PUF is not. Alternatively, other configurations may be used to create the binding PUF value from the internal and external PUF values.

FIG. 2 also depicts an optional symmetric key generation unit 240 and an optional encrypted memory 250 (illustrated with dashed lines). If desired, cryptographic fingerprint unit 235 can use the binding seed value (e.g., the identifier I) to generate a symmetric key that is used by cryptographic fingerprint unit 235 for encryption and decryption of the contents of an internal memory to secure the internal memory as encrypted memory 250. Encrypted memory 250 may be used to store data associated with hardware device 105 and physical structure 122. Encrypted memory 250 may also be used to store data about other items, such as a container used to transport items that used the binding of hardware device 105 and physical structure 122 (e.g., to prevent tampering, subversion, or proliferation), the items or contents being transported in the container, and/or the like.

Figure 3:
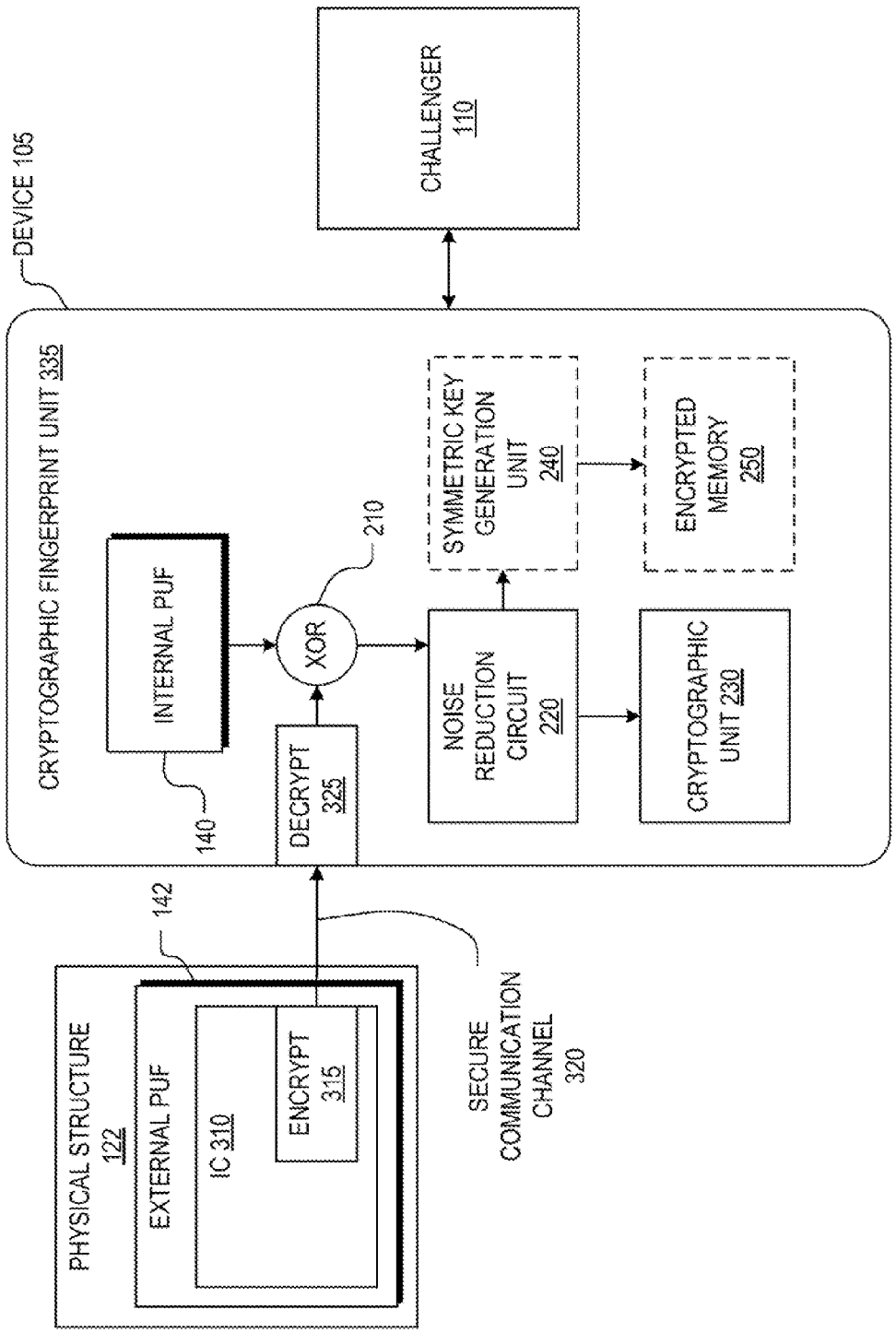
FIG. 3 is a functional block diagram illustrating a cryptographic fingerprint unit for authenticating a binding between the hardware device and the physical structure, in accordance with another embodiment of the invention.

It should be noted that the embodiments of FIG. 2 may be used in applications, such as in a pharmaceutical supply chain, which may not require the highest levels of security. In the embodiments of FIG. 2, the external PUF value is measured by cryptographic fingerprint unit 235 or sent to cryptographic fingerprint unit 235 over an unsecure communication channel. In other embodiments, other configurations may be used to communicate the external PUF value to hardware device 105 securely. For example, FIG. 3 depicts a modification to the fingerprinting infrastructure of FIGS. 1 and 2 that may be more suitable for applications, such as non-proliferation, that require higher levels of security. Referring back to FIG. 2, the communication of the external PUF value from physical structure 122 is unprotected and so could conceivably be spoofed by a motivated adversary. FIG. 3 may prevent spoofing of the physical structure's PUF by placing an IC 310, such as those used on smart cards to cover at least a portion of the physical structure's PUF, for example. Cryptographic fingerprint unit 335 is similar to cryptographic fingerprint unit 235 described above, except where specifically noted.

In one embodiment, the enrollment and authentication procedures are the same as described above with respect to FIG. 2, with the exception that the physical structure's PUF can be communicated to cryptographic fingerprint unit 335 (e.g., IC of the hardware device) over a secure, encrypted channel 320 using encryption logic 315 on IC 310 and decryption logic 325 of hardware device 105 (illustrated in FIG. 3 as part of cryptographic fingerprint unit 335). Encryption logic 315 is configured to encrypt the external PUF value before sending the external PUF value to cryptographic fingerprint unit 335. The decryption logic is configured to decrypt the external PUF value, which was encrypted by encryption logic 315. In one embodiment, secure communication channel 320 could be created with a mutual authentication protocol based on additional PUF values used to bind two integrated circuits together. Alternatively, IC 310 and cryptographic fingerprint unit 335 may use other encryption techniques to secure communication channel 320, such as symmetric key encryption, using a symmetric key agreed upon by the devices (e.g., IC 310 and hardware device 105) during enrollment and stored securely by the devices, or by some other means.

In these embodiments, instead of cryptographic fingerprint unit 335 measuring the external PUF value, IC 310 can measure the external PUF value and send the external PUF value to cryptographic fingerprint unit 335. In one embodiment, IC 310 covers at least a part of external PUF circuit 142. IC 310 can measure physical structure's PUF 142, such as, for example, from underneath IC 310. Any attempt to remove IC 310 to gain access to physical structure's PUF 142 would alter external PUF 142 and indicate tampering during authentication. In another embodiment, the external PUF circuit is a coating PUF (e.g., coating PUF 1300 depicted in FIG. 13) disposed to cover at least a portion of IC 310. The coating PUF may include a coating, which is doped with dielectric particles having random sizes and shapes. The dielectric particles have a relative dielectric constant that differs from the dielectric constant of the coating. IC 310 measures the coating PUF and sends the external PUF value to cryptographic fingerprint unit 335. In another embodiment, IC 310 sends the external PUF over an unencrypted channel.

As described above with respect to FIG. 2, binding logic 210 of cryptographic fingerprint unit 335 may be interposed between internal PUF 140 and noise reduction circuit 220 (illustrated in FIG. 3), or between noise reduction circuit 220 and cryptographic unit 230 (not illustrated in FIG. 3). Alternatively, other configurations may be used to create the binding PUF value from the internal and external PUF values.

In another embodiment, IC 310 can include a cryptographic system that includes encryption logic 315, as well as a noise reduction circuit, similar to noise reduction circuit 220 of cryptographic fingerprint unit 335. The noise reduction circuit converts the noisy external PUF value to a filtered PUF seed that is stable and repeatable. The noise reduction circuit could be used to remove uncertainty in the noisy external PUF value before encrypting and sending the external PUF value to cryptographic fingerprint unit 235. In another embodiment, IC 310 includes the noise reduction circuit without encryption logic 315 and sends the filtered external PUF value over an unsecure communication channel.

In some embodiment, external PUF circuit 142, which may be implemented using any PUF circuit having suitably small intra-device variation and sufficiently large inter-device variation, including but not limited to PUF circuits 900, 1000, 1100, 1200, along with primary circuitry 130 are both integrated into IC 310. For example, external PUF circuit 142 may be integrated into a semiconductor die of IC 310.

Figure 4:
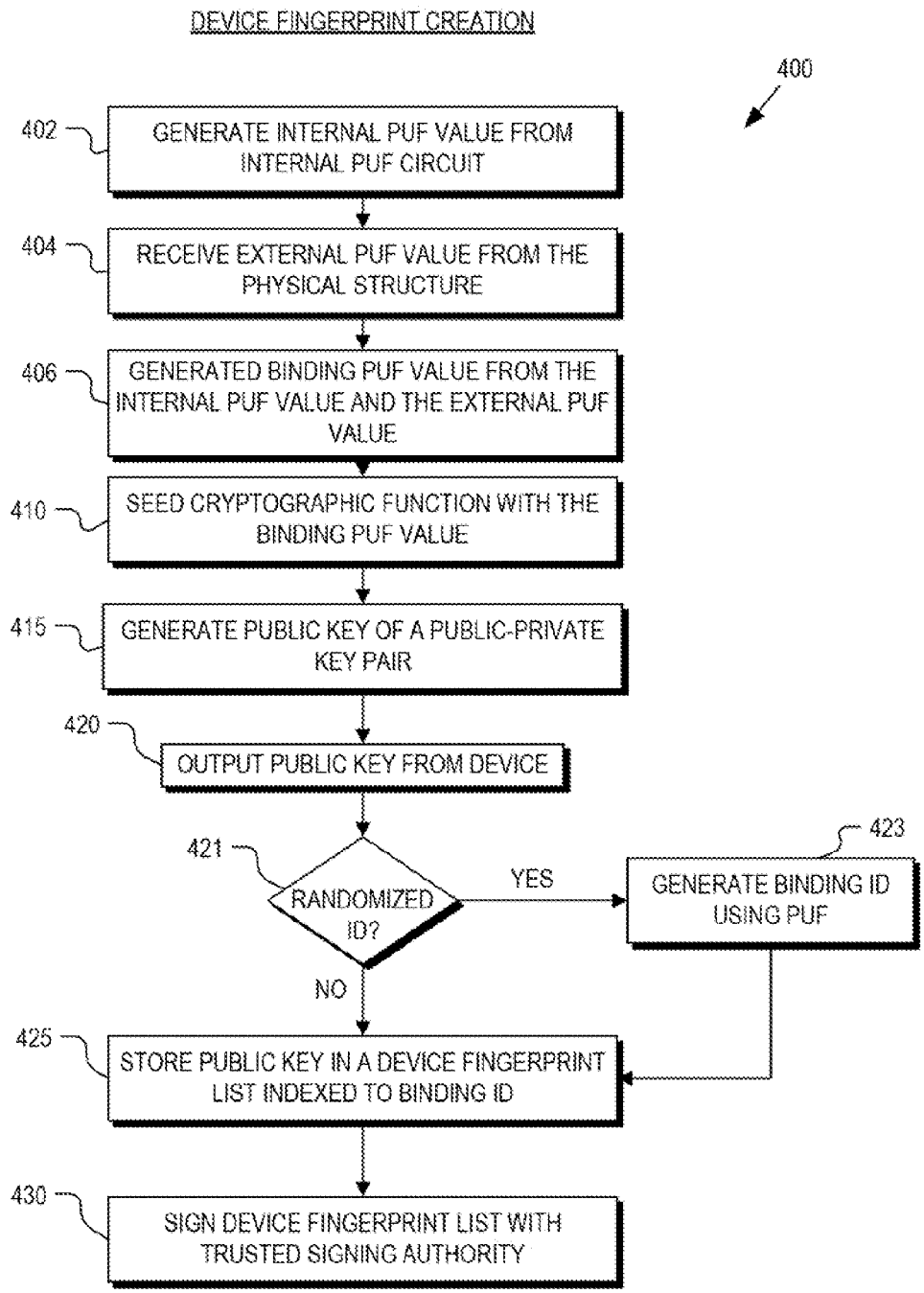
FIG. 4 is a flow chart illustrating a process for uniquely fingerprinting a binding of a hardware device and a physical structure, in accordance with an embodiment of the invention.

Operation of infrastructure 100 is described in connection with processes 400 and 500 illustrated in the flow charts of FIGS. 4 and 5, respectively. FIG. 4 is a flow chart illustrating process 400 for uniquely fingerprinting a binding of a hardware device and a physical structure, in accordance with an embodiment of the invention. The order in which some or all of the process blocks appear in process 400 should not be deemed limiting. Rather, one of ordinary skill in the art having the benefit of the present disclosure will understand that some of the process blocks may be executed in a variety of orders not illustrated.

In a process block 402, internal PUF circuit 140 generates a unique internal PUF value that is measured by cryptographic fingerprint unit 135 (or 235 or 235). The internal PUF value remains internal to hardware device 105 and is not transmitted externally. In one embodiment, the internal PUF value is generated in real-time each time it is need and is not stored for future use internally. The internal PUF value is a n-bit value (e.g., n=2474 bits) that may be generated via corresponding individual PUF circuits for each bit, generated in response to 'n' input test vectors that reconfigure a single PUF circuit to generate the n-bit value, or some combination of both. In a process block 404, binding logic 210 receives the external PUF value from physical structure 122. The external PUF value may be generated in real-time each time it is needed and is not stored for future use by physical structure 122 or hardware device 105. Since the external PUF value is generated externally to cryptographic fingerprint unit 135, the external PUF value may be encrypted using encryption logic on an IC disposed on physical structure 122 as described above. When receiving the encrypted external PUF value from physical structure 122, cryptographic fingerprint unit 335 decrypts the encrypted external PUF value before inputting the external PUF into binding logic 210. In a process block 406, binding logic 210 generates a binding PUF value from the internal PUF value and the external PUF value.

In a process block 410, the binding PUF value is used as a binding seed value to a cryptographic function. For example, the cryptographic function may be the creation of a public-private key pair where the binding PUF value is the binding seed value for the key generator. Hardware device 105 can delete all instances of the binding PUF value and the binding seed value within hardware device 105 after seeding the cryptographic function. In a process block 415, cryptographic fingerprint unit 135 generates the public key of a public-private key pair. In one embodiment, the public-private key pair is generated according to the RSA (Rivest, Shamir and Adleman) cryptographic algorithm using a binding seed value generated from the combined internal and external PUF values.

In a process block 420, the public key from the public-private key pair is output from device 125 via I/O ports 145. If a standard unique, binding identifier ("ID") is to be used (decision block 421), then process 400 continues to a process block 425. In process block 425, the public key is stored into a binding fingerprint list 115 and indexed to ID referencing device 125. In this context, the combination of the public key and ID operate as a sort of cryptographic hardware fingerprint that is uniquely associated with the particular hardware instance of hardware device 105. In one embodiment, the binding ID may be a combination of a manufacturing serial number, a globally unique identifier ("GUID"), or other unique identifier associated with hardware device 105, and a number associated with physical structure 122. Alternatively, the binding ID may be a random generated value or a pseudo-random generated value. Binding fingerprint list 115 may be populated by a manufacturer of hardware device 105 prior to hardware device 105 being shipped to customers as a means of tracking and authenticating part numbers. Binding fingerprint list 115 may subsequently be accessed by a customer, an OEM manufacturer incorporating hardware device 105 into a larger system, an end-user, or a third party interacting with hardware device 105 (either directly or remotely over a network) wishing to authenticate hardware device 105 (discussed in connection with FIG. 5). As an added security measure, binding fingerprint list 115 may be signed and maintained by a trusted third party, such as a certification authority 120 of a public key infrastructure (process block 430).

Returning to decision block 421, if the ID is to be randomized for added security, and then process 400 continues to a process block 423. In process block 423, cryptographic fingerprint unit 135 generates the ID as a randomized value. In one embodiment, the ID can be generated based on a portion of the binding PUF value output from PUF 140. In yet another embodiment, a second ID PUF may be included within cryptographic fingerprint unit 135 for generating a randomized ID. When generating a randomized PUF based ID, an enrollment procedure may be executed to handle rare situations of collisions between PUF based IDs of two different devices 105. In the event of an ID collision, the ID PUF can be "reprogrammed" using PUF perturbation devices 625 (discussed below in connection with FIG. 6), thus causing the ID PUF to generate a new, hopefully unique, ID value. PUF perturbation devices 625 can be reprogrammed multiple times during the enrollment procedure until a unique ID is obtained (statistically it is highly unlikely that perturbation devices 625 would have to be adjusted multiple times to achieve a unique output binding PUF value).

The above combination of elements and procedures forms a method of enrolling the binding of the hardware component and the physical structure, thus forming a deterrent against insertion of a subversion or substitution of a subverted component by an adversary who wishes to avoid attribution upon subsequent discovery of the subversion or against device tampering of content of a container, for example.

Figure 5:
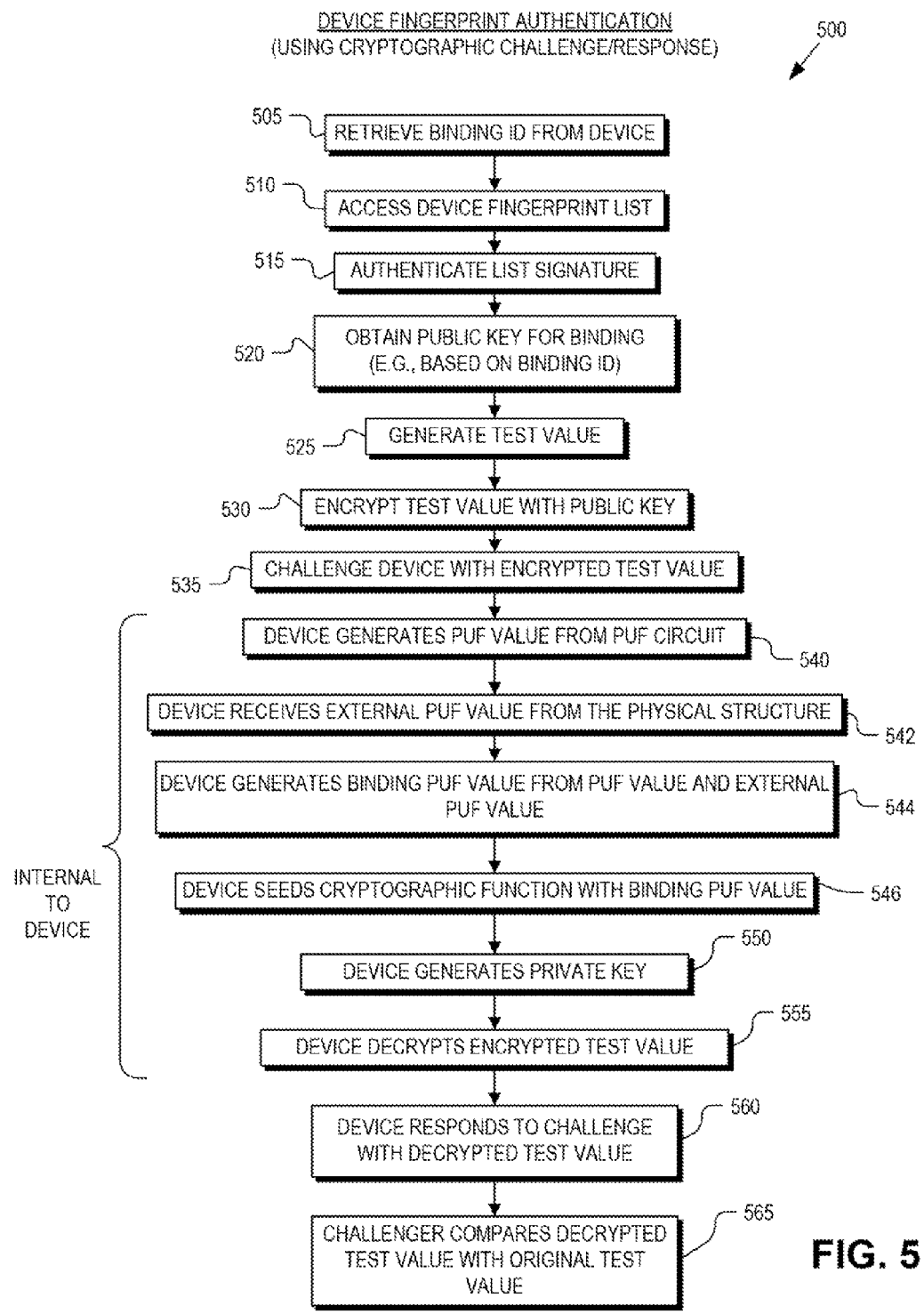
FIG. 5 is a flowchart illustrating a process for authenticating a binding of a hardware device and a physical structure during a deployment phase of its lifecycle using a cryptographic challenge/response and binding fingerprint, in accordance with an embodiment of the invention.

FIG. 5 is a flow chart illustrating a process 500 for authenticating a binding of a hardware device and a physical structure during the deployment phase of its lifecycle using a cryptographic challenge/response and a binding fingerprint, in accordance with an embodiment of the invention. The order in which some or all of the process blocks appear in process 500 should not be deemed limiting. Rather, one of ordinary skill in the art having the benefit of the present disclosure will understand that some of the process blocks may be executed in a variety of orders not illustrated.

In a process block 505, challenger 110 retrieves the binding ID associated with binding of hardware device 105 and physical structure 122. In one embodiment, challenger 110 retrieves the binding ID from hardware device 105 either manually or via an electronic query. For example, the binding ID may be a serial number physically displayed on the part (e.g., sticker, engraving, printed, etc.) or it may be electronically stored within hardware device 105 (e.g., within non-volatile memory).

In a process block 510, challenger 110 uses the binding ID to access the associated public key from binding fingerprint list 115. In one embodiment, the binding ID is used to retrieve a signed certificate from certification authority 120, which includes the public key. Upon accessing binding fingerprint list 115, the list itself may also be authenticated with reference to its certification signature to ensure the list has not been compromised (process block 515). If the signature is validly authenticated, then challenger 110 can retrieve the public key with assurances that it has not been tampered with (process block 520).

In a process block 525, challenger 110 generates a test value or test message for submission to cryptographic fingerprint unit 135 as a sort of secret phrase challenge. The test value can be a numeric value, an alphanumeric phrase, or otherwise. One embodiment uses a random nonce for the test value that is especially hard for anyone other than challenger 110 to predict. In a process block 530, challenger 110 encrypts the test value using the private key obtained in process block 520. In a process block 535, the encrypted test value is submitted to cryptographic fingerprint unit 135 as a sort of cryptographic challenge.

If the binding of hardware device 105 and physical structure 122 is the same as when enrolled, representing the original binding or a non-tampered binding; then hardware device 105 will be able to regenerate the binding PUF value used to seed the key generator that created the original public-private key pair. Thus, binding of hardware device 105 and physical structure 122 is the only binding that will be able to regenerate the original private key to decrypt the encrypted test value and respond to the challenged with the decrypted test value.

Accordingly, in a process block 540, internal PUF circuit 140 is enabled to regenerate the binding PUF value, and in a process block 542, binding logic 210 receives the external PUF value from physical structure 122. In a process 544, binding logic 210 generates the binding PUF from the internal and external PUF values, and seeds the cryptographic function with the binding PUF value (process block 546). In a process block 550, the key generator uses the binding PUF value to generate the private key. By recreating the private key at the time of being challenged (as opposed to retrieving a stored copy of the private key created at the time of adding the binding fingerprint into binding fingerprint list 115), the binding of hardware device 105 and physical structure 122 is contemporaneously being retested at the time of the challenge.

With the newly recreated private key, cryptographic fingerprint unit 135 decrypts the test value (process block 555) and responds to challenger 110 with the decrypted test value (process block 560). Finally, in a process block 565, challenger 110 compares the test value received in the response from hardware device 105 to the original test value it has selected and encrypted. If the two match, challenger 110 can be confident that the binding of hardware device 105 and physical structure 122 has not be tampered with, or subverted by substituting parts, since the only device in possession of the private key necessary to decrypt the test value would be hardware device 105 being challenged. It is noteworthy, that at no time is private key transmitted external to hardware device 105, and furthermore in some embodiments private key is not stored or retained any longer than required to respond to a given challenge. Each time hardware device 105 is cryptographically challenged on its authenticity, the private key is regenerated using the internal and external PUF values.

FIG. 6 is a functional block diagram illustrating a cryptographic fingerprint unit 600, in accordance with an embodiment of the invention. Cryptographic fingerprint unit 600 is one possible implementation of cryptographic fingerprint unit 135 illustrated in FIG. 1, cryptographic fingerprint unit 235 illustrated in FIG. 2, and cryptographic fingerprint unit 335 illustrated in FIG. 3. The illustrated embodiment of cryptographic fingerprint unit 600 includes a PUF circuit 605, binding logic 210, a noise reduction circuit 610, a key generator 615, a decryptor 620, PUF perturbation devices 625, and a control unit 630. The illustrated embodiment of noise reduction circuit 610 includes a data store 611, a seed generation mode 612, and a seed recovery mode 613.

Control unit 630 may receive inputs and generate outputs to be coupled to the components of fingerprint unit 600 to choreograph their operation. Control unit 630 may be implemented as software/firmware instructions executing on a microcontroller, an ASIC, a state machine, or otherwise. In some embodiments, control unit 630 need not control all of the components of fingerprint unit 600. For example, in an embodiment where PUF circuit 605 is implemented using a cross-coupled type PUF (illustrated in FIG. 11), then control unit 630 may not provide any control signaling to PUF circuit 605 or may simply include an enable signal to enable PUF circuit 605. However, in one embodiment where PUF circuit 605 is implemented using an arbiter type PUF (illustrated in FIG. 9A), control unit 630 may receive the SEL bits as the INPUT to configure PUF circuit 605. The SEL bits may be part of the cryptographic challenge posed by challenger 110.

PUF perturbation devices 625 are programmable devices that can be used to increase the variability of PUF circuit 605 by affecting the delay paths within PUF circuit 605. For example, PUF perturbation devices 625 may be programmable by the end user to facilitate user customization and user control over the variability and output of PUF circuit 605. In one embodiment, PUF perturbation devices 625 are During operation, PUF circuit 605 outputs an internal PUF value, which may be an inherently noisy value in some designs due to thermal variations, etc. Binding logic 210 receives the internal PUF value and an external PUF value from the external PUF circuit 607 as described above (e.g., measured by cryptographic fingerprint unit 135, 235 or 335, or measured and sent by an IC 310 to hardware device 105). Binding logic 210 combines the PUF value and the external PUF value, which may or may not be noisy, to create the binding PUF value (noisy). Instead of directly using the binding PUF value to seed the key generator 615, binding logic 210 can feed the binding PUF value (noisy) into noise reduction circuit 610, which is interposed between the key generator 615 and binding logic 210 to convert the noisy binding PUF value to a filtered binding PUF seed that is stable and repeatable. While it is desirable for a given PUF circuit 605 to output different, random values between different physical devices, it is not desirable for a given PUF circuit 605 of a single instance of hardware device 105 to output different values over its lifecycle (unless PUF perturbation devices 625 have been reprogrammed by the end user as part of a deliberate re-fingerprinting of hardware device 105). Thus, noise reduction circuit 610 operates to remove the uncertainty in the noisy binding PUF value, which may be caused by noisy PUF values from either or both of the internal and external PUF circuits. In one embodiment, noise reduction circuit 610 is implemented as a fuzzy extractor, which uses ECC techniques to remove undesirable variability. Operation of a fuzzy extractor implementation of noise reduction circuit 610 is discussed in detail in connection with FIGS. 7 and 8 below.

Key generator 615 is coupled to receive a binding seed value, which is based on the binding PUF value combined from the internal and external PUF values from PUF circuit 605 and external PUF circuit 607. Key generator 615 uses the binding seed value to seed its encryption engine and generate a unique public-private key pair. In one embodiment, the public-private key pair is generated according to the RSA cryptographic algorithm. During operation, the private key is also kept internal to cryptographic fingerprint unit 135 (235 or 335) and never exported externally from hardware device 105. In contrast, during the fingerprinting operation, the public key is exported from hardware device 105 along with a binding ID to enroll the binding fingerprint with binding fingerprint list 115.

Cryptographic fingerprint unit 135 (235 or 335) as the sole holder of the private key, is the only entity capable of decrypting a message encrypted using the corresponding public key so long as its binding with the physical structure is maintained. Thus, during an authentication event, challenger 110 presents its cryptographic challenge in the form of an encrypted message to hardware device 105. Decryptor 620 receives the challenge and uses the private key to decrypt the message and generate the response.

The illustrated embodiment of noise reduction circuit 610 includes at least two modes of operation: seed generation mode 612 and a seed recovery mode 613. Control unit 630 places noise reduction circuit 610 into the seed generation mode 612 when creating a new cryptographic binding fingerprint for the binding of hardware device 105 and physical structure 122, while control unit 630 places noise reduction circuit 610 into the seed recovery mode 613 during a cryptographic authentication event.

Figure 7:
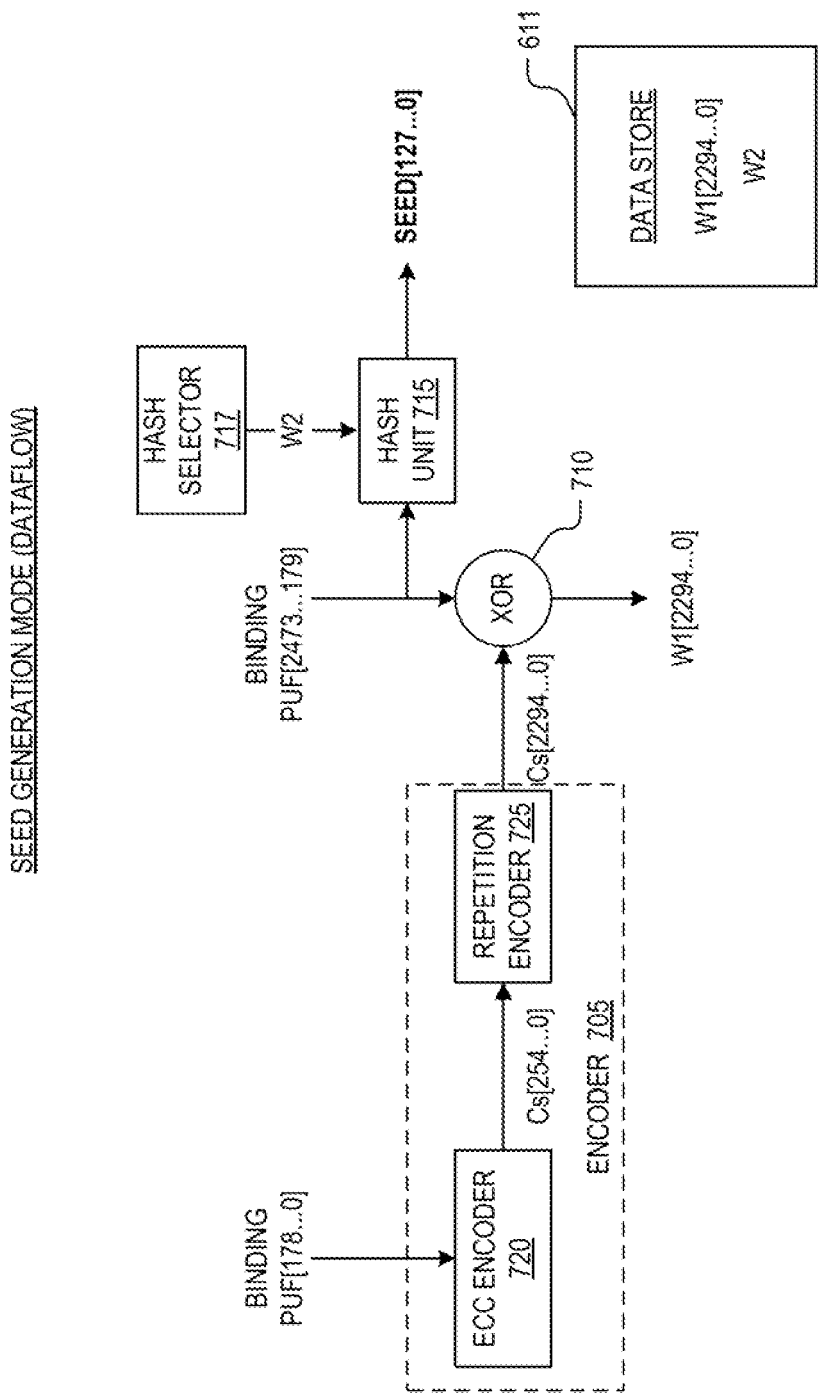
FIG. 7 is a dataflow diagram illustrating a seed generation mode of a noise reduction circuit during creation of a binding fingerprint, in accordance with an embodiment of the invention.

FIG. 7 is a dataflow diagram illustrating seed generation mode 612 of noise reduction circuit 610 during creation of a binding fingerprint, in accordance with an embodiment of the invention. During seed generation mode 612, noise reduction circuit 610 is configured to include an encoder 705, a logic unit 710, a hash unit 715, a hash selector 717, and data store 611. The illustrated embodiment of encoder 705 includes an ECC encoder 720 and a repetition encoder 725.

Noise reduction circuit 610 may be configured to operate in the seed generation mode 612 by enabling hardware components to implement the dataflow illustrated in FIG. 7, by loading/executing software/firmware modules to implement the dataflow illustrated in FIG. 7, by reconfiguring interconnections between the ECC encoder 720, repetition encoder 725, logic unit 710, and hash unit 715 to form the dataflow illustrated in FIG. 7, some combination thereof, or otherwise. Each component illustrated in FIG. 7 may be implemented entirely in hardware, entirely in software, or a combination of both.

In the illustrated embodiment, noise reduction in the noisy binding PUF value is achieved via application of error correction techniques to the binding PUF value so that future bit errors in the binding PUF value can be identified and corrected to generate a reliable, consistent, and less noisy seed value. A variety of ECC techniques may be applied (e.g., Reed-Solomon, repetition, Hamming, low-density parity-check (LDPC), etc); however, in one embodiment, ECC encoder 720 is implemented using a BCH (Bose, Chaudhuri, Hocquenghem) encoder to generate an error correcting codeword Cs. To ensure security and prevent an adversary from reverse generating the binding seed value, the codeword Cs should be selected randomly. Accordingly, in one embodiment, a first portion of the binding PUF value itself is used to generate the codeword Cs during the seed generation mode 612.

During operation of the seed generation mode 612, binding logic 210 is enabled, and the output value of PUF circuit 605 and external PUF circuit 607 are measured and combined to form the binding PUF value. A first portion of the binding PUF value binding PUF[178 . . . 0] is provided to encoder 705 while a second portion of the binding PUF value binding PUF[2473 . . . 179] is provided to logic unit 710 and hash unit 715. ECC encoder 720 uses the first portion binding PUF[78 . . . 0] to generate the codeword Cs[254 . . . 0]. The codeword is expanded using repetition encoder 725 to generate codeword Cs[2294 . . . 0]. Although FIG. 7 illustrates the use of a 255-bit codeword and a 9× repetition encoder, longer or shorter codewords and higher or lower repetition encoders may be used according to the level of noise in the binding PUF value. It should be noted that one technique for improving error correcting ability is to concatenate codes, such as by a concatenation of a strong code (such as BCH) and weak code (such as repetition) as described in connection with FIG. 7, but other techniques may be used. Similarly, although FIG. 7 illustrates a 2474-bit binding PUF value, longer or shorter binding PUF values may be used according to the desired strength of security. Repetition encoder 725 may be replaced by other types of encoders as well.

Logic unit 710 combines the second portion of the binding PUF value binding PUF[2473 . . . 179] with the codeword Cs[2294 . . . 0] to generate helper data W1[2294 . . . 0]. In the illustrated embodiment, logic unit 710 uses an XOR function to combine the two values, though other logic functions may be implemented (e.g., XNOR). The helper data W1[2294 . . . 0] is a value, which is used during the seed recovery mode 613 to regenerate the seed value SEED[127 . . . 0] generated during seed generation mode 612, but the helper data cannot easily be leveraged to surreptitiously reverse engineer the codeword Cs[2294 . . . 0]. Hash unit 715 hashes the second portion binding PUF[2473 . . . 179] to generate the fixed length seed value SEED[127 . . . 0]. The hash unit 715 performs a function known as "privacy amplification" or "entropy amplification" since the entropy per bit in the binding PUF[2473 . . . 179] will be less than one. In one embodiment, the width of the binding PUF value input into hash unit 715 and the width of the seed value output from hash unit 715 are engineered to compensate for average deficiency in entropy rate in the inter-device variability of the PUF measurements.

In one embodiment, for added security the particular hash algorithm is also selected from a large set of hash algorithms, in which case, helper data W2 indicating the particular hash algorithm selected is also stored into data store 611. In one embodiment, hash selector 717 generates W2 to implement a randomized selection of the hash algorithm. In one embodiment, hash selector 717 uses a portion of the binding PUF value to randomly select a particular hash algorithm from a liner feedback shift register (LFSR) hash. In one embodiment, hash selector 717 includes an LFSR hash coupled to receive a portion of the binding PUF value. The output of the LFSR hash is then coupled into an irreducible polynomial generator, which outputs the W2 value for selecting the hash algorithm. In yet another embodiment, hash selector 717 includes a random number generator coupled to an irreducible polynomial generator to generate W2.

Figure 8:
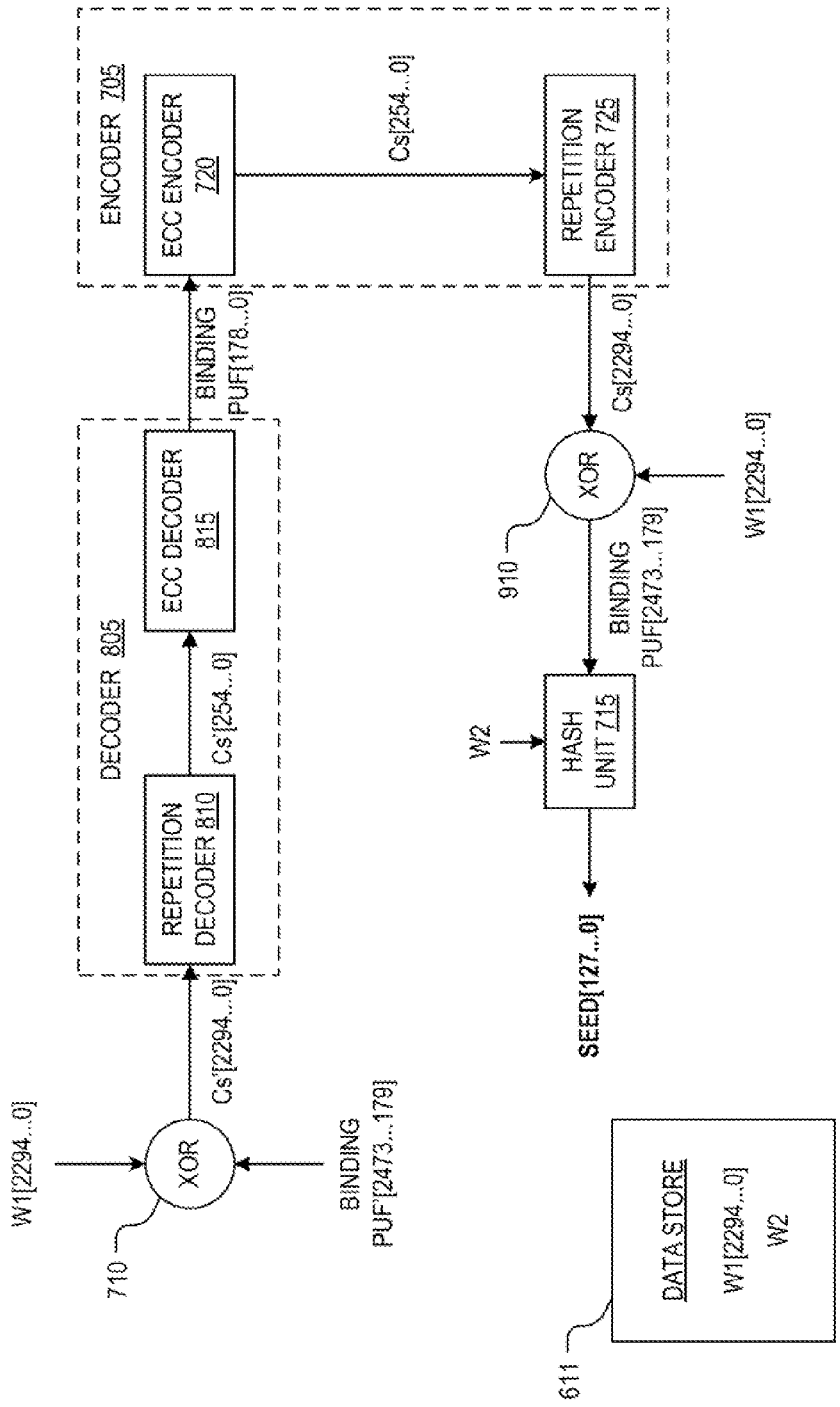
FIG. 8 is a dataflow diagram illustrating a seed recovery mode of a noise reduction circuit during authentication of a binding fingerprint, in accordance with an embodiment of the invention.

FIG. 8 is a dataflow diagram illustrating seed recovery mode 613 of noise reduction circuit 610 during authentication of a binding fingerprint, in accordance with an embodiment of the invention. During seed recovery mode 613, noise reduction circuit 610 is configured to include two logic units 710, a decoder 805, encoder 705, and hash unit 715. The illustrated embodiment of decoder 805 includes a repetition decoder 810 and an ECC decoder 815.

Noise reduction circuit 610 may be configured to operate in the seed recovery mode 613 by enabling hardware components to implement the dataflow illustrated in FIG. 8. The dataflow illustrated in FIG. 8 may be achieved by loading/executing software/firmware modules, by reconfiguring interconnections between the components, some combination thereof, or otherwise. Each component illustrated in FIG. 8 may be implemented entirely in hardware, entirely in software, or a combination of both.

During operation of the seed recovery mode 613, binding logic 210 is enabled and receives the PUF values from PUF circuit 605 and external PUF circuit 607. Since the PUF values may be noisy values, the measured values may not be identical to the original PUF values measured during seed generation mode 612, and thus, the binding PUF value may not be identical to the original binding PUF value generated during seed generation mode 612. Accordingly, the subsequently measured binding PUF value is labeled as BINDING PUF' and the error correcting codeword generated based on BINDING PUF' is labeled as Cs' in FIG. 8.

A first portion of the binding PUF' value BINDING PUF' [2473 ... 179] is combined by logic unit 710 with the helper data W1[2294 ... 0] to generate the codeword Cs'[2294 ... 0]. If BINDING PUF' happens to be identical to BINDING PUF, then Cs' would be equal to Cs. However, if BINDING PUF' is a noisy value with at least one flipped bit, then BINDING PUF' does not equal BINDING PUF and error correcting techniques will remove the errors and regenerate the original binding PUF value BINDING PUF[2473 ... 179] and the original seed value SEED[127 ... 0].

Repetition decoder 810 decodes Cs'[2294 ... 0] down to Cs'[254 ... 0], which is input into ECC decoder 815 to generate the original BINDING PUF[178 ... 0]. With the original first portion of the binding PUF value in hand, BINDING PUF[178 ... 0] is inserted back into encoder 705 to generate the original codeword Cs[2294 ... 0]. With Cs[2294 ... 0] in hand, logic unit 710 is once again used to combine Cs[2294 ... 0] with helper data W1[2294 ... 0] stored in data store 611 to regenerate the original second portion of the binding PUF value BINDING PUF[2473 ... 179]. Finally, hash unit 715 uses the second portion of the binding PUF value to recreate the original seed value SEED [127 ... 0]. If a fixed hash algorithm is not used, then helper data W2 is retrieved from data store 611 to select the appropriate hash algorithm.

Figure 9A:
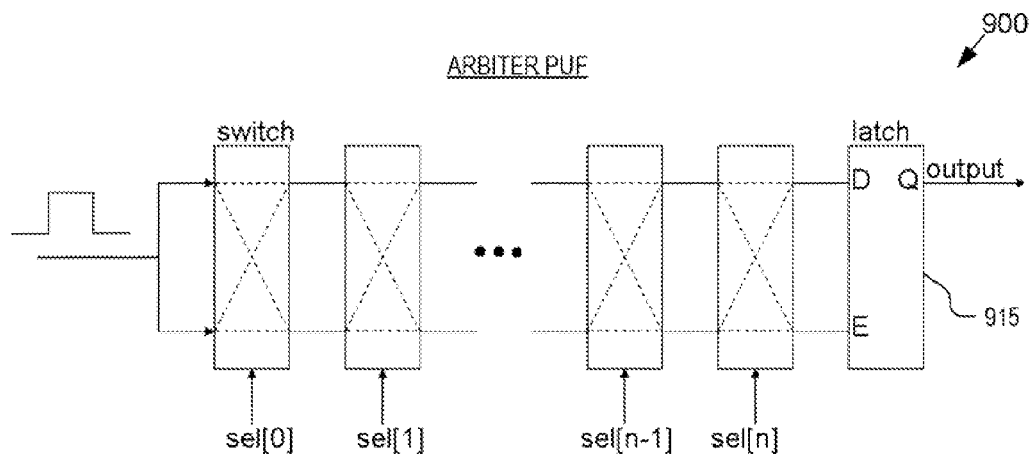
FIG. 9A is a logic circuit diagram of an arbiter type physically unclonable function ("PUF").
Figure 9B:
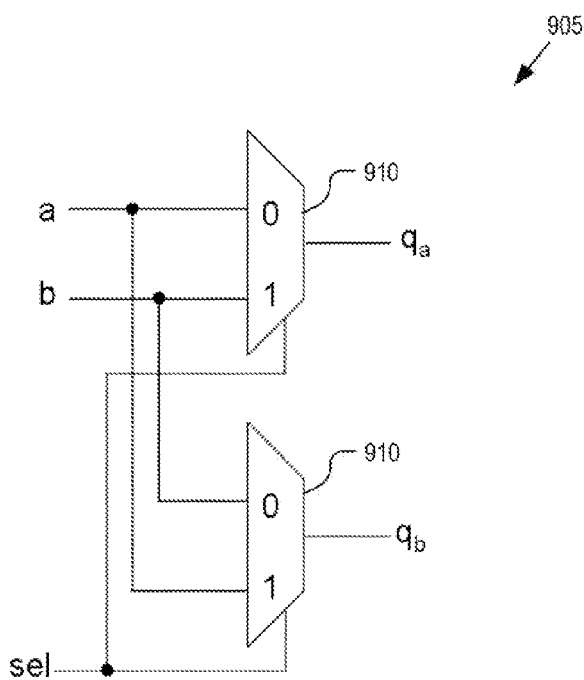
FIG. 9B is a logic circuit diagram of a switch element within an arbiter type PUF.

FIG. 9A is a logic circuit diagram of an arbiter PUF 900. Each stage of arbiter PUF 900 is a switch circuit 905, illustrated in FIG. 9B. FIG. 9B illustrates that switch circuit 905 includes a pair of two input multiplexers 910 with a shared select signal (SEL). When SEL is '1' the upper input a is routed to the lower output, $q_b$, and the lower input b is routed to the upper output, $q_a$. When SEL is '0' the inputs are not crossed over, and the a and b inputs pass straight through the module. Arbiter PUF 900 chains n switch circuits 905 together. At the first stage a pulse is presented to the a and b inputs at the same time. The signal then races along the two paths through the circuit, switching between the lower and upper paths as determined by the SEL input at each stage. After the last stage of arbiter PUF 900, an arbiter (e.g., latch 915) determines the output of the circuit; if the D input arrives first the output is '0' and if the E input arrives first the output is '1'.

Arbiter PUF 900 accepts an n-bit input SEL and produces as output a single bit. This generates a challenge-response pair wherein the challenge is the input, or sequence of inputs, and the response is the output or sequence of outputs. As such, this PUF has an intrinsic challenge-response capability. The PUF output is the response to a particular challenge. To achieve a k-bit response, one may provide k different inputs to a single arbiter PUF 900, evaluate k instantiations of arbiter PUF 900, or some combination thereof.

Figure 10:
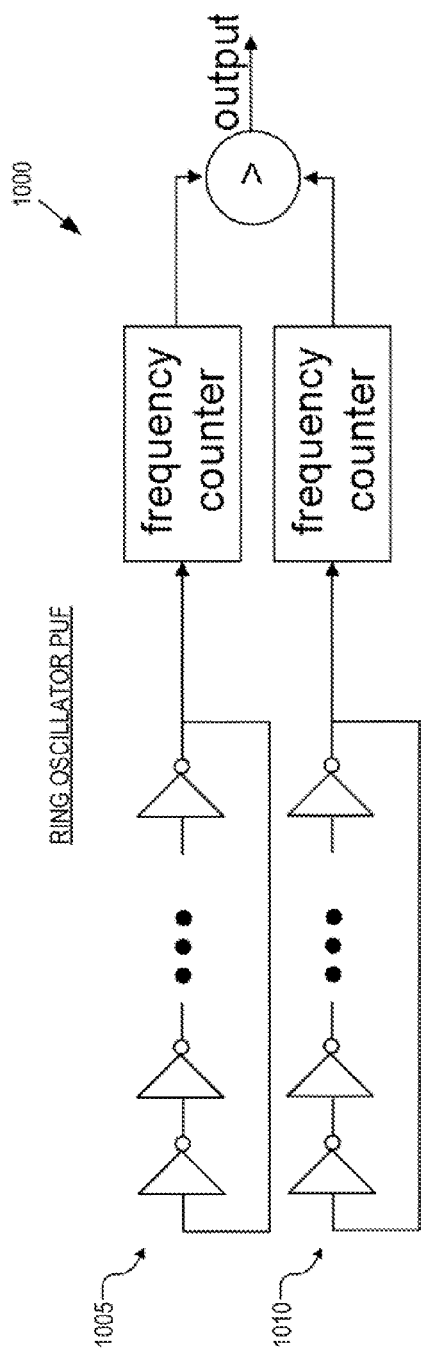
FIG. 10 is a logic circuit diagram of a ring oscillator type PUF.

FIG. 10 is a logic circuit diagram of a ring oscillator PUF 1000. Ring oscillator PUF 1000 exploits variations in the resonance frequencies of a set of identical ring oscillators 1005 and 1010. To produce an output bit the resonance frequencies of ring oscillators 1005 and 1010 are compared and the output bit is determined by which oscillator is fastest. A k bit sequence is produced by making k comparisons between multiple different ring oscillators; however, one should be careful to choose independent, uncorrelated comparisons. If the resonance frequency for oscillator i is $f_{osci}$, then if we have $f_{osc1} > f_{osc2}$ and $f_{osc2} > f_{osc3}$, then $f_{osc1} > f_{osc3}$, and the bit generated by comparing $f_{osc1}$ to $f_{osc3}$ is correlated to the bits produced by the other comparisons. When compared to arbiter PUF 900, disadvantages of ring oscillator PUF 1000 include area, speed, and power dissipation. However, ring oscillator PUF 1000 is likely easier to implement since it does not require routing two long, almost identical paths across an ASIC or FPGA, as is the case with arbiter PUF 900.

Figure 11:
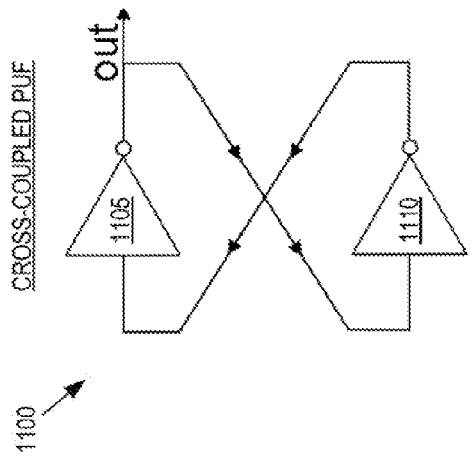
FIG. 11 is a logic circuit diagram of a cross-coupled type PUF.

FIG. 11 is a logic circuit diagram of a cross-coupled PUF 1100. Cross-coupled PUF 1100 uses a positive feedback loop to store a bit. Without applying any external stimulus, the output of cross-coupled PUF 1100 will attain a stable output. The value of this output results from differences in interconnect delay and the voltage transfer characteristics of the inverters 1105 and 1110. A k bit sequence can be obtained from k cross-coupled inverter pairs. Other logic gates, such as NAND and NOR gates, can also be connected in a cross-coupled configuration to be used as a PUF.

Figure 12:
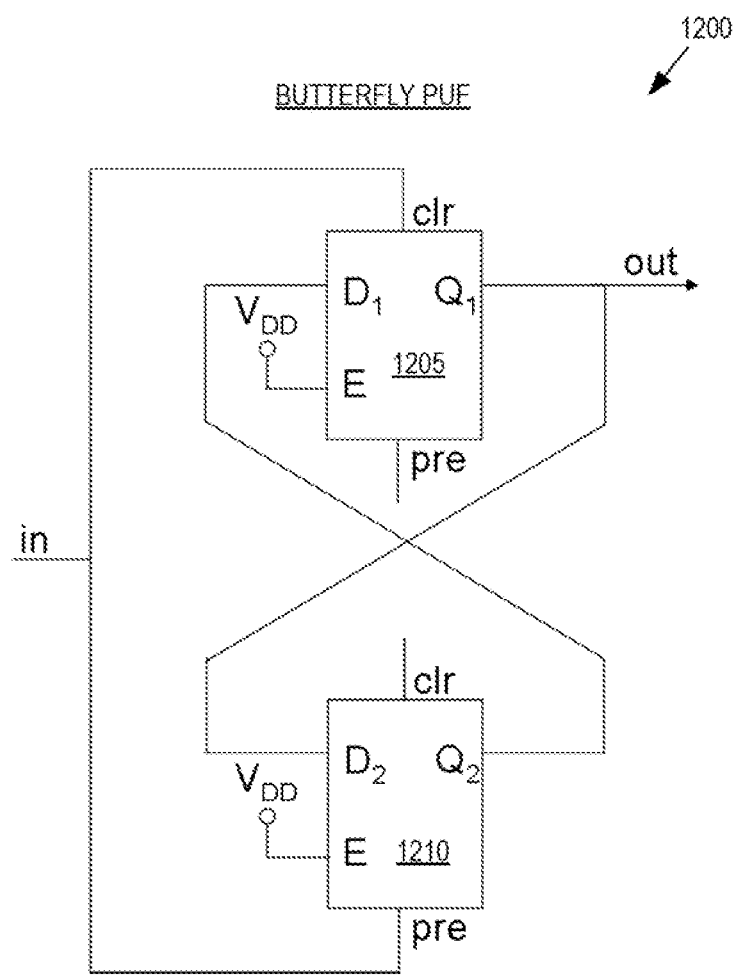
FIG. 12 is a logic circuit diagram of a butterfly type PUF.

FIG. 12 is a logic circuit diagram of a butterfly PUF 1200. The illustrated embodiment of butterfly PUF 1200 includes cross-coupled D latches 1205 and 1210. The enable inputs (E) to the latches are tied high so that the D input is always transferred to the Q output. To operate the circuit as a PUF, "in" is set to '1', which causes the active high "clr" and "pre" signals to set Q1='0', Q2='1'. Since the latches are cross-coupled, this forces D1='1' and D2='0'. These inputs are ignored while "in" is asserted. Next, "in" is set to '0', which causes the system to enter an unstable state. At this point, the positive feedback loop and differences in wire and latch propagation delays force the output to a stable value. As with cross-coupled PUF 1100, k bits are generated by implementing k butterfly PUFs within a given device.

Other PUF circuits, in addition to those illustrated in FIGS. 9-12, may be implemented in connection with embodiments of the invention as well. In fact, a variety of PUFs may be suitable, as long as, a given PUF design has sufficiently small intra-device variation and sufficiently large inter-device variation given a desired level of security. For example, intrinsic PUFs, which are created from a resource that already exists on an integrated, may be used. In the case of FPGAs, the startup values of SRAM and flip-flops may be leveraged. The primary advantage of intrinsic PUFs is that they are already present on the FPGA, and so only a readout circuit is needed to obtain the value of the PUF. In this sense, fewer FPGA resources are required to implement the function. However, in some cases it may be difficult to read the value of an intrinsic PUF, since SRAM and flip-flop states on FPGAs are commonly forced into a known state upon power up. As such, modification of the bit stream loaded into the FPGA may be necessary for readout.

Figure 13:
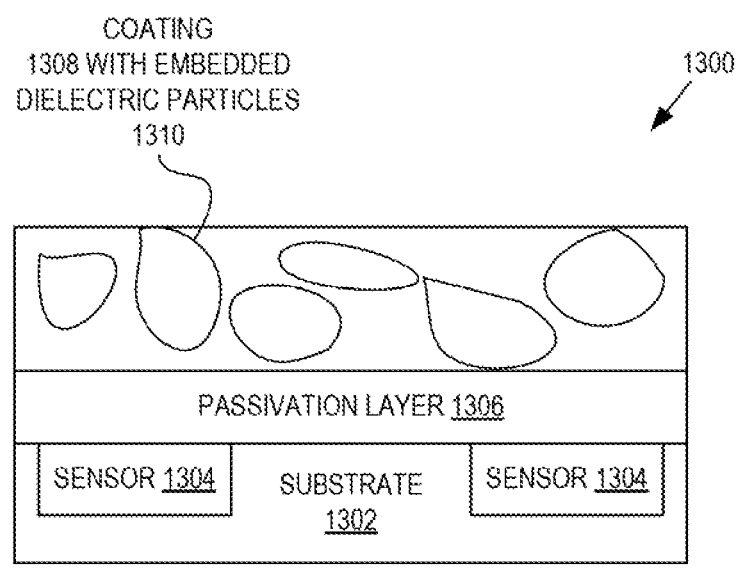
FIG. 13 is a cross-sectional view of a coating type PUF.

FIG. 13 is a cross-sectional view of a coating type PUF. The coating type PUF 1300 includes a substrate 1302 of a semiconductor die (e.g., silicon substrate), such as the substrate of the IC 310 of FIG. 3. The IC 310 can be covered with a coating 1308 (e.g., aluminophosphate), which is doped with random dielectric particles 1310 (e.g., $TiO_2$, $SrTiO_3$, $BaTiO_3$). The random dielectric particles 1310 may be particles of random size and shape with a relative dielectric constant $\in_r$ differing from the dielectric constant of the coating 1308. The coating PUF 1300 is made up of a combination of the coating 1308 with the dielectric material 1310. In order to challenge the coating PUF 1300, an array of metal sensors 1304 (e.g. a comb structure), is laid down beneath the passivation layer 1306 (e.g. nitride passivation layer) and the coating 1308. It should be noted that sufficient randomness is only obtained if the dielectric particles are smaller than the distance between the sensors 1304 (e.g. sensor plates). A challenge may correspond to a voltage of a certain frequency and amplitude applied to the sensors 1304 at a certain point of the sensor array. Because of the presence of the coating material 1308 with its random dielectric properties, the sensor plates 1304 behave as a capacitor with a random capacitance value. The capacitance value is then turned into a key. It should be noted that coating PUFs have the advantage of possessing a high degree of integration. The matrix containing the random particles can be part of the opaque coating. Thus, the tamper-resistance coating, which protects the secrets present in the electronics (stored and during computation), itself serves as a carrier of (inherently tamper-resistant) secrets. Coating PUFs also have the advantage that they can be easily turned into a controlled PUF (CPUF). The control electronics can simply be put underneath the coating. Probing the coating PUF from the outside gives insufficient information to the attacker. The outcomes of the capacitance measurements from inside are very sensitive to the precise locations of the dielectric particles. Even if the precise locations of the random particles are known, physical reproduction of the coating costs a prohibitive amount of effort because of the complexity. If successful probing is possible then electronic cloning may be feasible.

The processes explained above are described in terms of computer software and hardware. The techniques described may constitute machine-executable instructions embodied within a machine (e.g., computer) readable storage medium, that when executed by a machine will cause the machine to perform the operations described. Additionally, the processes may be embodied within hardware, such as an application specific integrated circuit ("ASIC") or the like.

A computer-readable storage medium includes any mechanism that provides (e.g., stores) information in a form accessible by a machine (e.g., a computer, network device, personal digital assistant, manufacturing tool, any device with a set of one or more processors, etc.). For example, a computer-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. An apparatus, comprising:
   a physical structure including an external physically unclonable function ("PUF") circuit disposed in or on the physical structure, the external PUF circuit coupled to output an external PUF value associated with the physical structure; and
   a hardware device communicatively coupled to the physical structure, the hardware device including a cryptographic fingerprint unit for authenticating a binding of the hardware device and the physical structure, the cryptographic fingerprint unit including:
      an internal PUF circuit disposed in or on the hardware device, the internal PUF circuit coupled to output an internal PUF value associated with the hardware device;
      binding logic coupled to receive the internal PUF value and the external PUF value associated with the physical structure, wherein the binding logic is configured to generate a binding PUF value using the internal PUF value and the external PUF value; and
      a cryptographic unit coupled to receive the binding PUF value, wherein the cryptographic unit is configured to use the binding PUF value to allow a challenger to authenticate the binding of the hardware device and the physical structure.

2. The apparatus of claim 1, wherein the hardware device comprises device circuitry configured to perform a primary function of the hardware device, wherein the hardware device comprises a first integrated circuit, wherein the internal PUF circuit and the device circuitry are integrated with the first integrated circuit.

3. The apparatus of claim 2, wherein the cryptographic fingerprint unit is configured to measure the internal PUF value output and the external PUF value associated with the physical structure.

4. The apparatus of claim 2, further comprising a second integrated circuit disposed in or on the physical structure, wherein the second integrated circuit is configured to measure the external PUF value and send the external PUF value to the cryptographic fingerprint unit.

5. The apparatus of claim 4, wherein the second integrated circuit is disposed to cover at least a part of the external PUF circuit.

6. The apparatus of claim 4, wherein the external PUF circuit is an optical coating PUF disposed on or within the second integrated circuit.

7. The apparatus of claim 4, wherein the second integrated circuit comprises encryption logic, wherein the encryption logic is configured to encrypt the external PUF value before sending the external PUF value to the cryptographic fingerprint unit, and wherein the hardware device comprises decryption logic to decrypt the external PUF value encrypted by the encryption logic.

8. The apparatus of claim 1, wherein the physical structure is at least one of strain-sensitive tape, a fastener, a dielectric material having printed conductive wires or traces, a polymer having embedded conductive particles, a coating having embedded dielectric particles, a flexible substrate, or a semiconductor die.

9. The apparatus of claim 1, wherein the hardware device further comprises a radio-frequency identification (RFID) tag.

10. The apparatus of claim 1, further comprising:
an internal memory to store data; and
a symmetric key generation unit to generate a symmetric key, based on the binding PUF, for encryption and decryption of the data stored in the internal memory.

11. The apparatus of claim 1, wherein the cryptographic unit comprises:
a key generator coupled to generate a private key and a public key based on the binding PUF value; and
a decryptor coupled to receive an authentication challenge, posed to the apparatus and encrypted with the public key, and coupled to output a response to the authentication challenge decrypted with the private key.

12. The apparatus of claim 11, wherein the cryptographic unit is configured to delete the private key after decrypting the authentication challenge.

13. The apparatus of claim 11, further comprising a noise reduction circuit coupled between the binding logic and the key generator, the noise reduction circuit coupled to receive the binding PUF value, to reduce uncertainty in the binding PUF value, and to output a binding seed value to the key generator based on the binding PUF value.

14. The apparatus of claim 13, wherein the noise reduction circuit includes a seed generation mode, wherein during the seed generation mode the noise reduction circuit comprises:
an encoder coupled to the binding logic to receive a first portion of the binding PUF value and to generate an error correcting codeword based on the first portion of the binding PUF value, the error correcting codeword for reducing the uncertainty in the binding PUF value; and
a hash unit coupled to the binding logic to receive a second portion of the binding PUF value and to generate the binding seed value for coupling to the key generator.

15. The apparatus of claim 13, wherein the noise reduction circuit includes a seed recovery mode, wherein during the seed recovery mode the noise reduction circuit comprises:
a first logic circuit coupled to combine the binding PUF value with helper data according to a logic function to generate a first codeword;
a decoder coupled to decode the first codeword;
an encoder coupled to the decoder to re-encode the first codeword to generate a second codeword;
a second logic circuit coupled to combine the second codeword with the helper data according to the logic function to re-create a second portion of the binding PUF value; and
a hash unit coupled to the second logic circuit to re-create the binding seed value based on the second portion of the binding PUF value re-created by the second logic circuit.

16. A method for cryptographically fingerprinting a binding of a hardware device and a physical structure, the method comprising:
generating an internal physically unclonable function ("PUF") value using an internal PUF circuit disposed within the hardware device;
receiving an external PUF value from the physical structure, wherein the physical structure includes an external PUF circuit disposed in or on the physical structure, the external PUF circuit coupled to output an external PUF value associated with the physical structure;
generating a binding PUF value using the internal PUF and the external PUF;
seeding a cryptographic function based on the binding PUF value;
generating a cryptographic key from the cryptographic function; and
storing the cryptographic key associated with a binding identifier of the binding of the hardware device and the physical structure as a binding fingerprint for future use by a challenger to authenticate the binding of the hardware device and the physical structure using a cryptographic challenge and response.

17. The method of claim 16, wherein storing the cryptographic key associated with the binding identifier comprises storing the cryptographic key associated with the binding identifier in a binding fingerprint list which includes binding fingerprints for a plurality of bindings between hardware devices and physical structures, wherein the binding fingerprint list is external to the hardware device.

18. The method of claim 17, further comprising certifying the binding fingerprint list with a certification authority.

19. The method of claim 16, wherein generating the cryptographic key comprises generating the cryptographic key as a public key of a private-public key pair.

20. The method of claim 16, further comprising randomly generating the binding identifier within the hardware device, and wherein the binding identifier is generated based upon at least a portion of the binding PUF value.

21. The method of claim 16, wherein generating the internal PUF value using the internal PUF circuit disposed within the hardware device comprises generating the internal PUF value with at least one of an arbiter PUF, a ring oscillator PUF, a cross-coupled PUF, and a butterfly PUF.

22. The method of claim 16, further comprising:
selecting an error correcting codeword for reducing noise in a second portion of the binding PUF value based upon a first portion of the binding PUF value; and
generating a binding seed value for seeding the cryptographic function based on the second portion of the binding PUF value.

23. The method of claim 22, further comprising deleting all instances of the binding PUF value and the binding seed value within the hardware device after seeding the cryptographic function.

24. The method of claim 22, wherein generating the binding seed value comprises hashing the second portion of the binding PUF value to generate the binding seed value, wherein a relative bit-width between the second portion of the binding PUF value and the binding seed value is selected to achieve a desired entropy value per bit of the binding seed value.

25. A method for cryptographically authenticating a binding of a hardware device and a physical structure, the method comprising:

retrieving a binding identifier of the binding of the hardware device and the physical structure, wherein the physical structure includes an external physically unclonable function ("PUF") circuit disposed in or on the physical structure, the external PUF circuit coupled to output an external PUF value associated with the physical structure;

using the binding identifier to retrieve a binding fingerprint for the binding of the hardware device and the physical structure, the binding fingerprint including a cryptographic key, wherein the binding fingerprint is based upon a binding PUF value generated by a combination of an internal PUF circuit disposed within the hardware device and the external PUF value associated with the physical structure; and authenticating the binding of the hardware device and the physical structure using the cryptographic key.

26. The method of claim 25, wherein the cryptographic key is a public key of a public-private key pair, and wherein said authenticating the binding comprises:

encrypting a message with the public key to generate an encrypted message;

challenging the hardware device to decrypt the encrypted message; and determining whether the binding of the hardware device and the physical structure has been compromised based upon whether the hardware device is able to decrypt the encrypted message.

27. The method of claim 26, wherein challenging the hardware device to decrypt the encrypted message comprises providing a cryptographic challenge to a cryptographic fingerprint unit within the hardware device via an access port.

28. The method of claim 25, wherein retrieving the binding identifier of the binding of the hardware device and the physical structure comprises querying the hardware device to obtain the binding identifier from the hardware device.

29. The method of claim 25, wherein using the binding identifier to retrieve the binding fingerprint for the binding of the hardware device and the physical structure, comprises:

accessing a binding fingerprint list maintaining a plurality of binding fingerprints indexed to a plurality of binding identifiers, wherein the binding fingerprint list is maintained by a third party and accessed via a network;

authenticating a cryptographic signature of the binding fingerprint list; and obtaining the cryptographic key.

30. The method of claim 25, wherein the binding PUF value is generated in real-time each time the hardware device is challenged.

31. The apparatus of claim 1, wherein the cryptographic fingerprint unit includes a plurality of programmable PUF perturbation devices coupled to one or more signal paths within the internal PUF circuit or disposed adjacent to the one or more signal paths, wherein the programmable PUF perturbation devices influence delays associated with the one or more signal paths based on a programmed state of the PUF perturbation devices.

* * * * *